United States Patent
Humphris

(10) Patent No.: US 9,939,460 B2
(45) Date of Patent: Apr. 10, 2018

(54) SCANNING PROBE SYSTEM WITH MULTIPLE PROBES

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 15/617,402

(22) Filed: Jun. 8, 2017

(65) Prior Publication Data

US 2017/0356931 A1 Dec. 14, 2017

(30) Foreign Application Priority Data

Jun. 10, 2016 (GB) .................................. 1610128.9

(51) Int. Cl.
*G01Q 30/00* (2010.01)
*G01Q 20/00* (2010.01)

(52) U.S. Cl.
CPC ............ *G01Q 30/00* (2013.01); *G01Q 20/00* (2013.01)

(58) Field of Classification Search
USPC .................................. 850/5, 6, 33
See application file for complete search history.

(56) References Cited

U.S. PATENT DOCUMENTS

| | | |
|---|---|---|
| 2005/0050947 A1 | 3/2005 | Kitajima et al. |
| 2006/0230474 A1 | 10/2006 | Mininni et al. |
| 2010/0149545 A1* | 6/2010 | Aeppli ................. G01B 11/161 356/501 |
| 2010/0186132 A1 | 7/2010 | Humphris et al. |
| 2014/0026263 A1 | 1/2014 | Humphris |
| 2015/0013035 A1 | 1/2015 | Humphris et al. |
| 2015/0219685 A1 | 8/2015 | Humphris |
| 2015/0219686 A1 | 8/2015 | Humphris |
| 2015/0285836 A1 | 10/2015 | Humphris et al. |
| 2017/0016932 A1 | 1/2017 | Humphris |

FOREIGN PATENT DOCUMENTS

| | | |
|---|---|---|
| EP | 1898204 A1 | 3/2008 |
| WO | WO-2015/011448 A1 | 1/2015 |

OTHER PUBLICATIONS

International Search Report issued in PCT/GB2014/052196, dated Aug. 14, 2014.

* cited by examiner

*Primary Examiner* — Kiet T Nguyen
(74) *Attorney, Agent, or Firm* — Marshall, Gerstein & Borun LLP

(57) ABSTRACT

A method of operating a scanning probe system that includes a probe support and probes carried by the probe support is disclosed. Each probe includes a cantilever extending from the support to a free end and a tip carried by the free end. The system is operated to perform interaction cycles, each including in an approach phase, moving the support so that the tips move together towards the sample surface; in a detection step, generating a surface signal on detection of an interaction of the tip(s) of a first subset of the probes with the sample surface before the rest of the probes have interacted with the sample; in a response step changing a shape of the cantilever(s) of the first subset in response to the generation of the surface signal; and in a retract phase moving the support so that the tips retract together away from the sample surface.

20 Claims, 18 Drawing Sheets

3a  3b 3  3c 3  3c  6

6

SCANNING PROBE SYSTEM WITH MULTIPLE PROBES

TECHNOLOGICAL FIELD

The present disclosure relates to a scanning probe system with multiple probes, and an associated method.

BACKGROUND

A known scanning probe system with multiple probes is described in US2010/0186132. The probe assembly comprising a carrier with at least three probes, each probe having a tip that is located on a plane that is common to the probe tips and that is moveable from this plane. The probes are substantially identical and the assembly also includes addressing means adapted to select one of the probes for relative movement with respect to a majority of the remainder of the probes. Examples of suitable arrangements for actuating and detecting multiple probes are described in US2015/0219685 and US2015/0219686.

SUMMARY OF THE DISCLOSURE

A first aspect provides a method of operating a scanning probe system according to claim 1. A second aspect provides a scanning probe system according to claim 18. A probe support is moved so that the tips of the probes move together towards and away from the surface of the sample in a series of interaction cycles. Each interaction cycle includes a detection step in which a surface signal is generated on detection of an interaction of the (or each) tip of a first subset of the probes with the surface of the sample before the rest of the probes have interacted with the sample. In a response step after the detection step, a shape of the (or each) cantilever of the first subset of the probes is changed in response to the generation of the surface signal. The generation of the surface signal acts as a trigger to change the shape of the cantilever(s) of the first subset of the probes.

A "hybrid" method of operation is provided in which the tips of the probes are controlled both by the movement of the probe support, and by changing the shape of the cantilever(s). The first subset of the probes may be one of the probes, or more than one of the probes. Typically the response step comprises changing the shape of the cantilever(s) of the first subset of the probes in response to the generation of the surface signal whilst keeping the shape of the cantilever(s) of the rest of the probes substantially unchanged.

In a first embodiment the retract phase starts sufficiently soon after the response step to prevent the tip(s) of the rest of the probes from interacting with the surface of the sample at any time during the multiple interaction cycles. In this embodiment the response step typically comprises changing the shape of the cantilever(s) of the first subset of the probes in a first sense (for instance by bending, unbending, twisting or untwisting) and the method further comprises in a probe selection step changing the shape of the cantilever(s) of the first subset of the probes in a second sense (for instance by unbending, bending, untwisting or twisting) opposite to the first sense to select the first subset of the probes and move the tip(s) of the first subset of the probes closer to the surface of the sample than the tip(s) of the rest of the probes. Typically each interaction cycle comprises such a probe selection step.

Typically the multiple probes comprise four or more probes, and the rest of the probes comprise three or more probes with tips which lie in a common plane which moves towards the surface of the sample during the approach phase. Optionally the response step comprises changing the shape of the cantilever(s) of the first subset of the probes in response to the generation of the surface signal to move the tip(s) of the first subset of the probes towards the common plane or into the common plane.

Optionally the method further comprises repeating the method with a newly selected second subset of the probes, over a further set of multiple interaction cycles. The newly selected second subset of the probes may interact with the same sample, or with a different sample.

In a second embodiment the retract phase is sufficiently delayed after the response step to ensure that the tip(s) of the rest of the probes also interact with the surface of the sample between the response step and the retract phase for each one of the multiple interaction cycles. Optionally the tips of all of the probes interact once, and only once, with the surface of the sample during each interaction phase.

Typically the multiple probes comprise three or more probes, with tips which lie in a common plane which moves towards the surface of the sample during the approach phase due to the motion of the probe support. The tips which lie in the common plane may undergo a small periodic dither motion about the common plane—typically with an amplitude less than 10 nanometres and a frequency greater than 1 MHz. In such a case the tips can still be considered to lie in a common plane since the dither motion is very small compared with the motion of the probe support. Optionally the response step comprises changing the shape of the cantilever(s) of the first subset of the probes in response to the generation of the surface signal to move the tip(s) of the first subset of the probes out of the common plane.

Optionally each interaction cycle further comprises in a control phase after the response step and before the retract phase, controlling the movement of the probe support so that the probe support follows a predetermined trajectory—for instance moving at a constant rate towards the surface of the sample. Optionally the probe support moves by a predetermined distance towards the surface of the sample during the control phase.

The movement of the probe support may be controlled during the control phase so that the tip(s) of the rest of the probes are prevented from interacting with the surface of the sample—as in the first embodiment mentioned above. Alternatively it may be controlled so that the tip(s) of the rest of the probes also interact with the surface of the sample during the control phase—as in the second embodiment mentioned above.

Optionally the tips of the probes move together towards the surface of the sample at a substantially constant rate during the approach phase, and/or in a linear overshoot phase after the response step and before the retract phase.

Optionally the probe support moves towards the surface of the sample at a substantially constant rate during the approach phase, and/or in a linear overshoot phase after the response step and before the retract phase.

Optionally each interaction cycle further comprises: in a linear overshoot phase after the response step, controlling the movement of the probe support so that the tip(s) of the rest of the probes continue moving towards the surface of the sample at the substantially constant rate; and in a deceleration phase after the linear overshoot phase and before the retract phase, controlling the movement of the probe support so that the motion of the tip(s) of the rest of the probes towards the surface of the sample slows down and then stops. Alternatively the linear overshoot phase may be omitted, and the probe support decelerated immediately after the response step.

The shape of the cantilever(s) may be changed in the response step by bending, unbending, twisting or untwisting the cantilever, or by changing its shape in any other way. Most preferably the response step comprises unbending the cantilever(s).

The shape of the cantilever(s) may be changed in the response step by electrical heating, by a piezoelectric actuator or by some other means. However more preferably the response step comprises changing an illumination of the cantilever(s) of the first subset of the probes, thereby changing the shape of the cantilever(s) of the first subset of the probes. The intensity of the illumination typically increases or decreases during the response step.

The tip(s) of the first subset of the probes may retract away from the surface of the sample during the response step, or the tip(s) may remain in contact with the surface of the sample during the response step—for instance to enable a measurement to be taken during the response step, which in this case constitutes a measurement phase.

Typically a lateral scanning movement is generated between the probe support and the surface of the sample. This scanning movement may be generated by motion of the probe support in a scanning plane and/or by motion of the sample in a scanning plane. Typically the probe support is moved orthogonally to the scanning plane during the approach and retract phases. Typically the scanning movement occurs simultaneously with the movement of the tips of the probes towards and away from the surface of the sample during the approach and retract phases.

Preferably the surface detector is arranged to direct one or more sensing beams onto the cantilever(s) of at least the first subset of the probes, thereby generating one or more respective reflected sensing beams which is/are analysed to detect the interaction of the probe tip(s) with the surface of the sample. For example the surface detector may comprise an optical lever, or an interferometer arranged to direct a sensing beam onto the cantilever thereby generating a reflected sensing beam, combine the reflected sensing beam with a reference beam to generate an interferogram, and generate a detection signal from the interferogram.

Preferably the system further comprises a measurement system which takes a measurement from the surface of the sample for each cycle in response to receipt of the surface signal from the surface detector. For instance each measurement may be a height measurement. Optionally the measurements may be used to determine a topography of the surface of the sample. Alternatively the measurements may be used to determine a material property (for instance stiffness) of the surface of the sample.

The measurement system may take one measurement or multiple measurements from the surface of the sample for each cycle in response to receipt of the surface signal from the surface detector.

The primary purpose of the system may be measurement of the sample (for instance microscopy) or modification of the sample (for instance nanolithography).

Each probe tip may be supported by only a single cantilever beam, or it may be supported by multiple cantilever beams as shown in US2017/0016932.

The interaction cycles are preferably a continuous series of interaction cycles, in which each cycle in the series starts immediately after a preceding cycle in the series.

BRIEF DESCRIPTION OF THE DRAWINGS

Embodiments will now be described with reference to the accompanying drawings, in which:

FIG. 2 is a detailed view of the detector in the system of FIG. 1a;

DETAILED DESCRIPTION

Figure 1A:
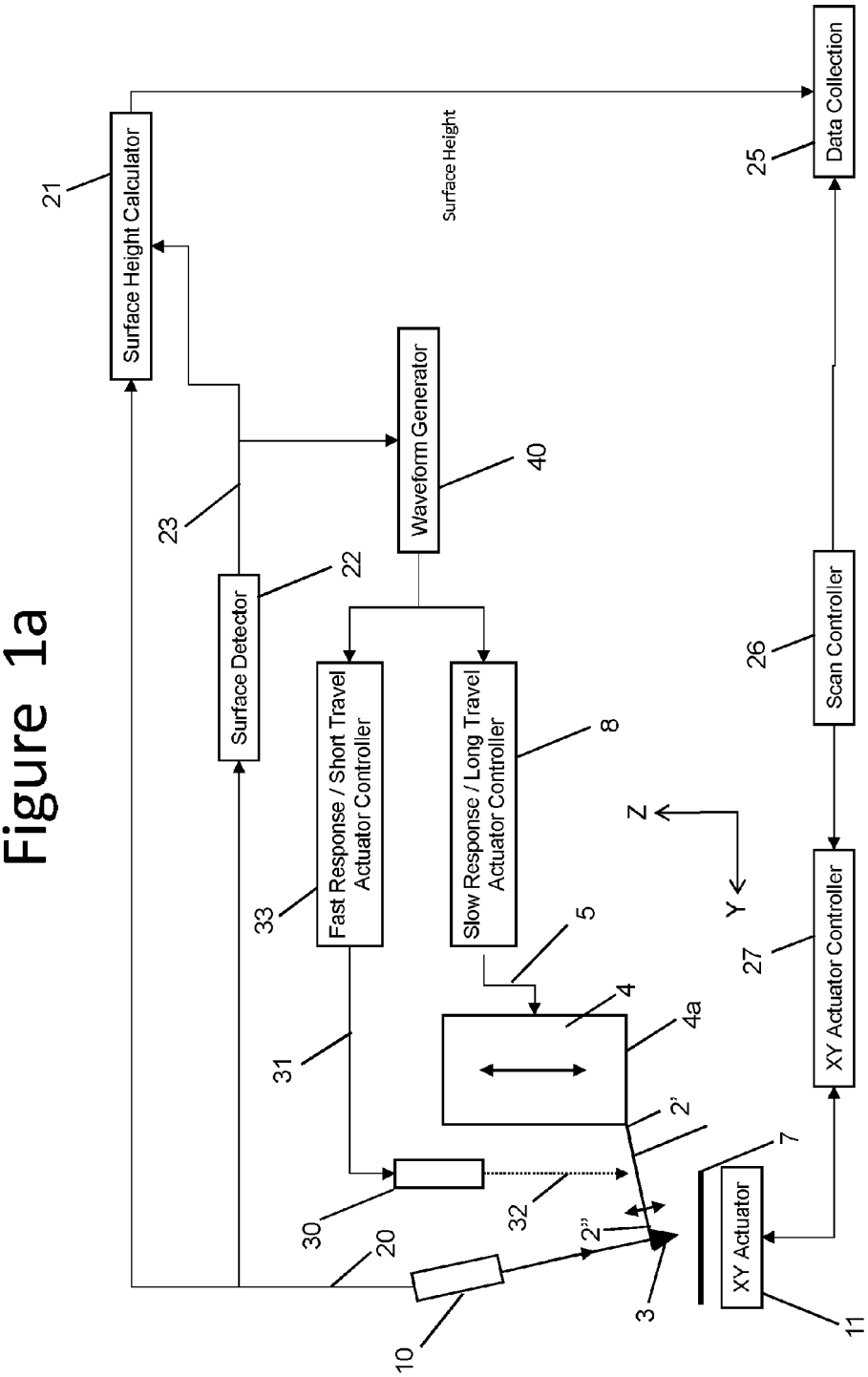
FIG. 1a shows a scanning probe microscopy system.
Figure 2:
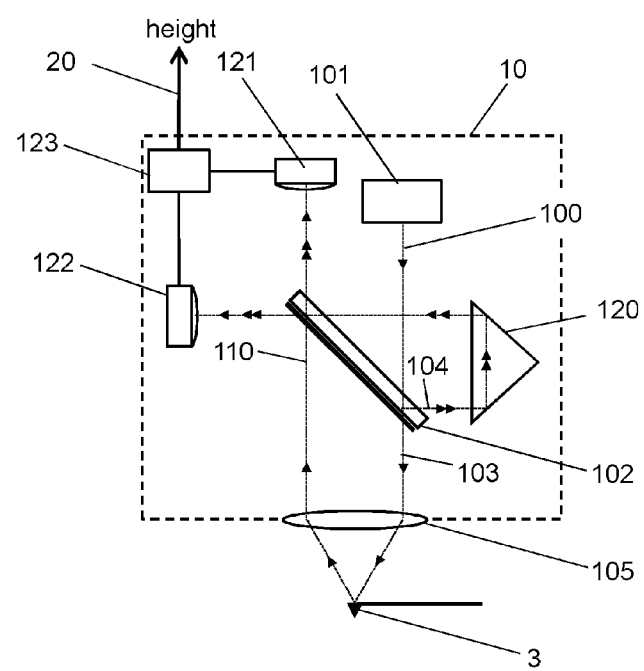

A scanning probe microscopy system according to a first embodiment is shown in FIGS. 1a and 2. The system comprises a first driver 4 with a bottom surface 4a which carries multiple probes. The bottom surface 4a acts a probe support for all of the probes and will be referred to below as the probe support 4a.

Only one of the probes is shown in FIG. 1a, which is shown viewed from the side in a −X direction (the orthogonal Z and Y directions being shown in FIG. 1a). The probe shown in FIG. 1a comprises a cantilever 2 extending from the probe support 4a to a free end 2″ and a tip 3 carried by the free end 2″ of the cantilever.

Figure 1B:
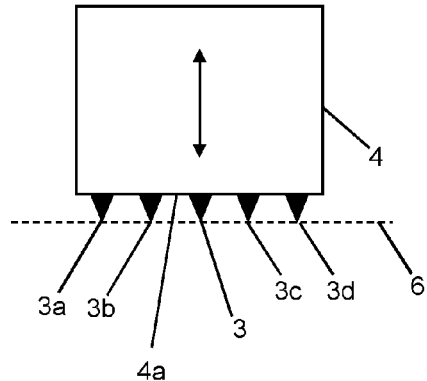
FIGS. 1b and 1c show all of the probes carried by the probe support.
Figure 1C:
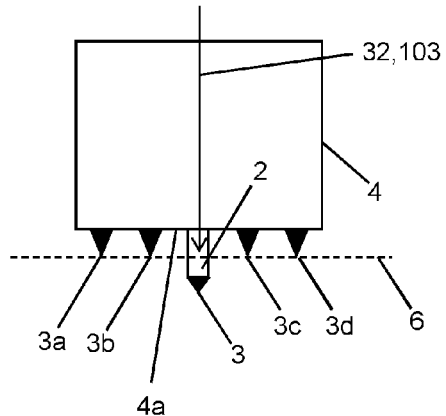

FIGS. 1b and 1c show all of the probes carried by the probe support 4a, viewed end-on in the −Y direction. In this example there are five probes, but optionally there may be three or four probes, or more than five probes. FIG. 1b shows the tips 3 and 3a-3d of the five probes all lying in a common plane 6. FIG. 1c shows the central probe with its cantilever bent down by an actuation beam 32 as in FIG. 1a so that its tip 3 has moved out of the common plane 6 containing the tips 3a-d of the other probes.

Figure 1D:
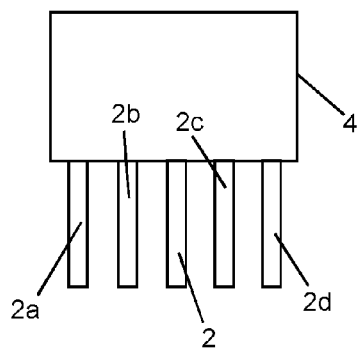
FIG. 1d shows all five cantilevers.

The cantilevers of the five probes are hidden in FIG. 1b but all are similar in length and structure to the cantilever 2 of the central probe with the tip 3. FIG. 1d is a view in the −Z direction (i.e. viewed from above) showing all five cantilevers 2, 2a-d.

The five probes may be the same, or different (for instance with different length cantilevers, or different types of tip). In this example the five probes are all the same, so only the central probe 2, 3 will be described in detail below.

The probe tip 3 comprises a three dimensional, often conical or pyramidal structure. The tip tapers to a point that is its closest point of interaction with a surface under interrogation. The cantilever 2 supports the probe tip 3 at its free end 2" and at its base 2' is held by the probe support 4a.

The probe is generally fabricated from silicon or silicon nitride. Typically, the cantilever 2 is around 50-200 µm long, 20-50 µm wide and around 0.2-2 µm thick, but this size can of course be varied according to application. The shape may also be varied: typically it is rectangular or triangular with, in the latter case, the tip in the vicinity of its apex. The tip 3 is typically 5 µm at its base, 3-10 µm high and with an end radius of curvature of 2-20 nm. In use, the fine point at the end of the tip is oriented towards a sample 7. Alternatively the probe may have a cantilever around 5-20 µm long and 3-10 µm wide, with a correspondingly smaller tip.

The first driver 4 is a piezoelectric actuator which expands and contracts up and down in the Z-direction in accordance with a first drive signal at a first driver input 5. As described further below, the first drive signal causes the first driver 4 to move the five probes repeatedly towards and away from the sample 7 in a series of interaction cycles. The first drive signal is generated by a first controller 8. Typically the first driver 4 is mechanically guided by flexures (not shown).

An interferometer detector 10 is arranged to detect a height of the free end 2b of the selected cantilever 2 directly opposite to the probe tip 3. FIG. 1a only shows the detector 10 schematically and FIG. 2 gives a more detailed view. Light 100 from a laser 101 is split by a beam splitter 102 into a sensing beam 103 and a reference beam 104. The reference beam 104 is directed onto a suitably positioned retro-reflector 120 and thereafter back to the beam splitter 102. The retro-reflector 120 is aligned such that it provides a fixed optical path length relative to the vertical (Z) position of the sample 7. The beam splitter 102 has an energy absorbing coating and splits both incident 103 and reference 104 beams to produce first and second interferograms with a relative phase shift of 90 degrees. The two interferograms are detected respectively at first 121 and second 122 photodetectors.

Ideally, the outputs from the photodetectors 121, 122 are complementary sine and cosine signals with a phase difference of 90 degrees. Further, they should have no dc offset, have equal amplitudes and only depend on the position of the cantilever and wavelength of the laser 101. Known methods are used to monitor the outputs of the photodetectors 121, 122 while changing the optical path difference in order to determine and to apply corrections for errors arising as a result of the two photodetector outputs not being perfectly harmonic, with equal amplitude and in phase quadrature. Similarly, dc offset levels are also corrected in accordance with methods known in the art.

These photodetector outputs are suitable for use with a conventional interferometer reversible fringe counting apparatus and fringe subdividing apparatus 123, which may be provided as dedicated hardware, FPGA, DSP or as a programmed computer. Phase quadrature fringe counting apparatus is capable of measuring displacements in the position of the cantilever to an accuracy of $\lambda/8$. That is, to 66 nm for 532 nm light. Known fringe subdividing techniques, based on the arc tangent of the signals, permit an improvement in accuracy to the nanometre scale or less. In the embodiment described above, the reference beam 104 is arranged to have a fixed optical path length relative to the Z position of the sample 7. It could accordingly be reflected from the surface of a stage (not shown) on which the sample 7 is mounted or from a retro-reflector whose position is linked to that of the stage. The reference path length may be greater than or smaller than the length of the path followed by the beam 103 reflected from the probe. Alternatively, the relationship between reflector and sample Z position does not have to be fixed. In such an embodiment the reference beam may be reflected from a fixed point, the fixed point having a known (but varying) relationship with the Z position of the sample. The height of the tip is therefore deduced from the interferometically measured path difference and the Z position of the sample with respect to the fixed point.

The interferometer detector 10 is one example of a homodyne system. The particular system described offers a number of advantages to this application. The use of two phase quadrature interferograms enables the measurement of cantilever displacement over multiple fringes, and hence over a large displacement range. Examples of an interferometer based on these principles are described in U.S. Pat. No. 6,678,056 and WO2010/067129. Alternative interferometer systems capable of measuring a change in optical path length may also be employed. A suitable homodyne polarisation interferometer is described in EP 1 892 727 and a suitable heterodyne interferometer is described in U.S. Pat. No. 5,144,150.

Returning to FIG. 1a, the output of the detector 10 is a height signal on a height detection line 20 which is input to a surface height calculator 21 and a surface detection unit 22. The surface detection unit 22 is arranged to generate a surface signal on a surface detector output line 23 for each cycle when it detects an interaction of the probe tip 3 with the sample 7.

The selected cantilever 2 is also driven by a second driver 30 with a second driver input 31. The second driver 30 is a laser which illuminates the cantilever with an actuation beam 32, the actuation beam 32 heating the cantilever 2 and causing it to bend down along its length so that the probe tip 3 moves down relative to the probe support 4a and the base 2' of the cantilever. Preferably the silicon nitride cantilever 2 has a gold coating on its upper surface. This gold coating thermally expands more than the silicon nitride material when heated by the actuation beam. Thus any modification of the intensity of the actuation beam 32 causes the cantilever 2 to heat up or cool down and thereby bend down or unbend up relative to the first driver 4.

The second driver 30 is arranged to change the shape of the cantilever 2 in accordance with a second drive signal at the second driver input 31. The second drive signal is generated by a second controller 33. As described in further detail below, a waveform generator 40 is arranged to receive the surface signal from the surface detector output line 23 and modify the second drive signal on the second driver input 31 in response to receipt of the surface signal, the modification of the second drive signal causing the second driver 30 to control the selected probe—more specifically to unbend the probe in opposition to the first drive signal so that the probe tip 3 rapidly decelerates in Z and then retracts away from the sample 7.

Figure 3:
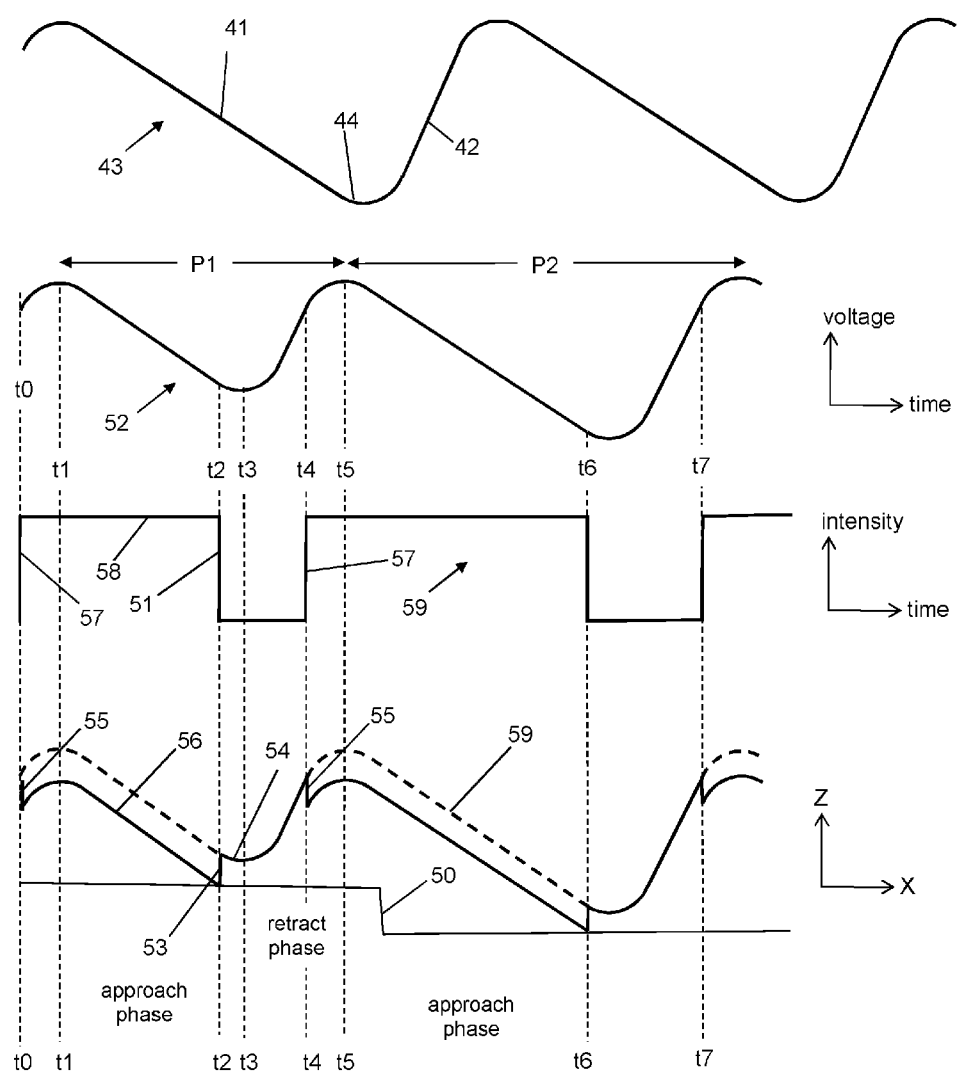
FIG. 3 shows the first and second drive signals and the associated trajectory of the probe tip.

The waveform generator 40 is arranged to control the first and second drive signals as shown in FIG. 3 during the scanning of a sample. When the probes are in free space away from the sample, then the first drive signal has an un-modified form shown at 43. The un-modified first drive signal 43 has a cyclic form, each cycle being identical. Each cycle has an approach phase 41, a deceleration phase 44, and a retract phase 42. During the approach phase 41 the probe support 4a, cantilevers 2, 2a-d and probe tips 3, 3a-d translate down together towards the surface of the sample; during the deceleration phase they decelerate in Z; and during the retract phase 42 they translate up together away from the surface of the sample. At the bottom of FIG. 3 a surface of the sample 7 is shown with a step 50, and the trajectory of the selected probe tip 3 scanning across the surface is shown.

Each interaction cycle starts with a probe selection step during which the waveform generator 40 sets the second drive signal as indicated at 57 to turn on the actuation beam 32 and illuminate a selected one of the probes—in this case the centre probe 2, 3. The probe selection step of the first cycle is at time t0, and the probe selection step of the second cycle is at time t4. This probe selection step causes the cantilever 2 to become bent as indicated in dashed lines in FIG. 4 at 63 and the probe tip 3 to move rapidly towards the sample as indicated at 55 in FIG. 3. During each probe selection step, the tip of the selected one of the probes (in this case the tip 3) moves out of the common plane 6 containing the tips 3a-d of the rest of the probes from the position shown in FIG. 1b to the position shown in FIG. 1c. The other cantilevers 2a-d remain unselected and unbent during this probe selection step so that the tips 3a-d of the other probes remain in the common plane 6 as shown in FIG. 1c. The trajectory of the unselected probe tips, and the probe support 4a, is indicated by a dashed line 59 in FIG. 3.

Between time t1 and t2 there is an approach phase before generation of the surface signal during which the first driver 4 moves the selected probe down towards the surface of the sample, together with the rest of the probes. The vertical (Z) component of the probe tip trajectory between t1 and t2 is driven by the first driver 4, whereas the lateral horizontal (XY) scanning component is driven by a piezoelectric XY-actuator 11 which moves a sample stage (not shown) carrying the sample 7 under the control of a scan controller 26 and an actuator controller 27. In this example the relative horizontal motion between the probes and the sample in the XY plane is generated by motion of the sample in the XY scanning plane rather than by motion of the probes. In another embodiment the relative lateral scanning movement in the XY scanning plane may be generated instead by motion of the probe support 4a (the sample remaining stationary).

The cyclic vertical motion imparted by the first driver 4 has a frequency of the order of 10 kHz and an amplitude of the order of 200-1000 nm. The raster-scanning horizontal motion in the XY direction imparted by the XY-actuator 11 has a frequency of the order of 1-100 Hz and an amplitude of the order of 1 micron. Hence the vertical (Z) motion is dominant and the X and Z components of the trajectory in FIG. 3 are not to scale.

Rather than imparting a continuous raster-scanning motion, the XY-actuator 11 may instead generate a stop and step motion in which each approach/retract cycle is performed at a static location (with motion of the probe support in Z but no motion imparted in X or Y by the XY-actuator). This may be preferable for very deep and narrow structures where no XY motion is desirable during the interaction cycle.

For the majority of the approach phase between t1 and t2 the first drive signal 52 changes at a substantially constant and predetermined rate, so the probe tip 3 moves towards the surface of the sample at a substantially constant speed as indicated by straight line 56.

In a detection step at time t2 the surface detection unit 22 detects an interaction of the probe tip 3 with the surface of the sample 7 and outputs the surface signal. The surface signal is generated by a resonant detection method which operates as follows. The waveform generator 40 provides a periodic dither signal which is tuned to a flexural or torsional resonance frequency of the cantilever 2 of the selected probe. This dither signal is used to modulate the laser 30, or another photothermal actuation laser (not shown). The dither signal brings about periodic photothermal stress in the cantilever, which excites a periodic dither motion of typically between 1-10 nanometers in amplitude at a frequency of the order of MHz. Note that the amplitude of the periodic dither motion is much lower than the non-resonant motion generated by the second drive signal 59 on the second driver input 31 as indicated in FIGS. 3 at 53 and 55. By way of example the non-resonant motion 53, 55 may have a travel distance which is 10-1000 times larger than the amplitude of the periodic dither motion.

In the example above the dither signal is tuned to a flexural or torsional resonant frequency of the cantilever 2, bringing about a periodic resonant motion, but in an alternative embodiment the dither signal may be at a different frequency so the dither motion is non-resonant.

The selected probe 2, 3 is advanced towards the surface until its tip 3 interacts with the surface, typically arising from repulsive forces but any force interaction that is present could in principle be employed. As a result a change in amplitude, phase or frequency of the periodic dither motion occurs which is detected by the surface detection unit 22 and causes the surface detection unit 22 to generate the surface signal. Other detection schemes for resonant detection are known in the art and can be implemented accordingly. For example, a torsional resonance could be employed, and the torsional motion of the probe monitored.

The surface height calculator 21, or any other suitable measurement system, measures the surface height based on the output of the interferometer 10 at the time of generation of the surface signal. Each measurement of surface height (one per cycle) is triggered by the surface signal and sent by the surface height calculator 21 to a data collection unit 25.

Figure 4:
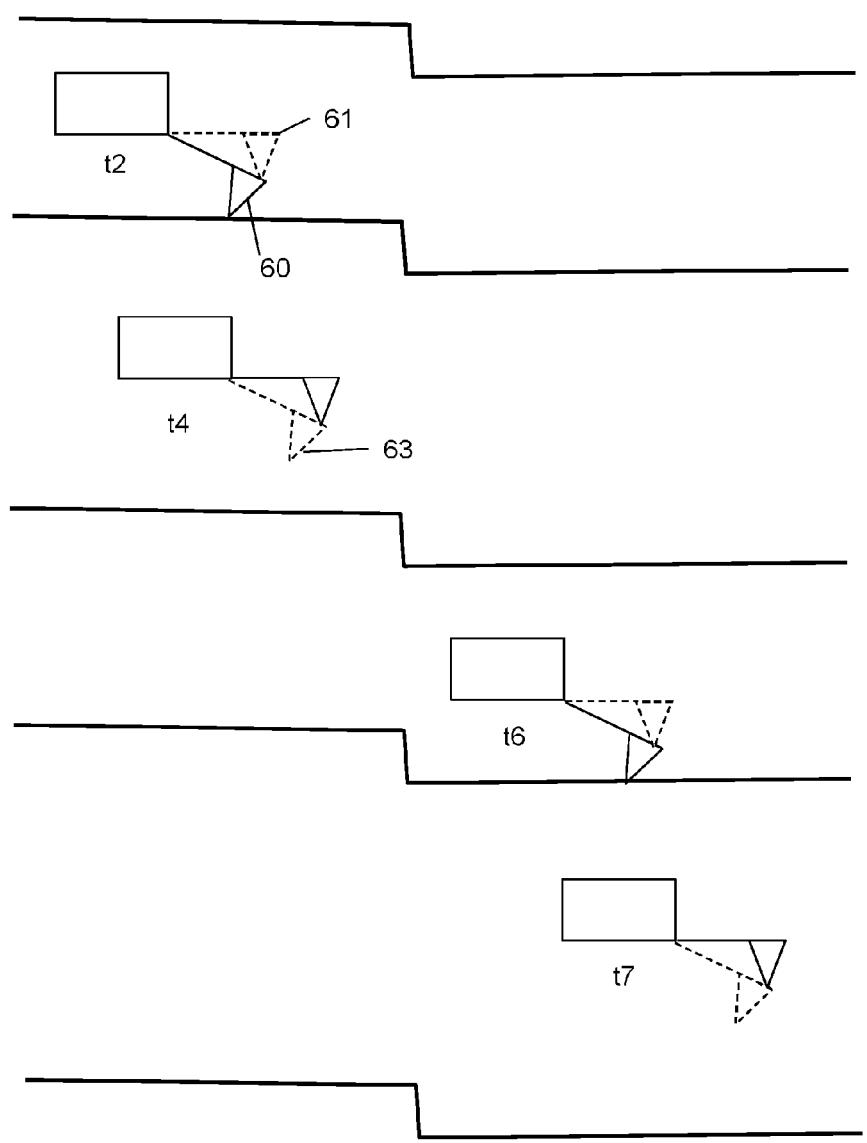
FIG. 4 shows the probe traversing a downward step in the surface of a sample.

During the approach phase between time t1 and time t2 the second drive signal is high as indicated at 58, so the actuation beam 32 is on and the cantilever 2 of the selected probe has a bent shape as shown at the top of FIG. 4. The surface signal at time t2 acts as a trigger for the waveform generator 40 to modify the second drive signal 59 on the second driver input 31 as indicated in FIG. 3 at 51 so the second drive signal goes from high to low (turning off the actuation beam 32). This modification of the second drive signal causes the cantilever 2 to cool and the probe tip 3 to retract away from the sample 7 from the surface position 60 (FIG. 4) to the retracted position 61 shown in dashed lines. During this response step immediately after the detection step at time t2, the cantilever 2 deforms by unbending as shown in FIG. 4, whilst the first drive signal is continuing to drive the base 2' of the cantilever down. So the modification 51 of the second drive signal causes the second driver 30 to unbend the selected probe 2, 3 in opposition to the first drive signal which continues to drive all of the probes down towards the sample 7. This modification 51 of the second drive signal 59 causes the probe tip 3 to rapidly retract away from the surface of the sample as indicated at 53 while the first driver 4 continues to move the probe support 4a down slowly towards the surface of the sample.

In this example the modification of the second drive signal at time t2 causes the actuation beam 32 to turn off completely so the cantilever 2 of the selected one of the probes unbends completely and its tip 3 moves all the way back into the common plane 6 containing the tips 3a-d of the other probes. In another example, the modification of the second drive signal at time t2 may simply reduce the intensity of the actuation beam 32, causing the cantilever 2 of the selected one of the probes to unbend only partially so its tip 3 moves towards the common plane 6 containing the tips 3a-d of the other probes, without fully returning to the common plane 6.

The waveform generator 40 is also arranged to modify the first drive signal in response to receipt of the surface signal, the modification of the first drive signal causing the first driver 4 to decelerate more slowly than the deceleration caused by the modification of the second drive signal, and then retract the base of the cantilever away from the sample. The modified first drive signal is indicated at 52 in FIG. 3. The first drive signal 52 is modified more slowly than the second drive signal 59 in response to the receipt of the surface signal because the maximum rate of deceleration of the first driver 4 may be limited by a number of factors—for instance the size and weight of the piezoelectric actuator, or other parts of the system such as the connection between the cantilever and the probe support 4a. Modifying the first drive signal slowly ensures a controlled motion, for example, avoiding the generation of undesirable resonances.

At time t2 the waveform generator 40 modifies the first drive signal on the first driver input 5 so the rate of change of the first drive signal gradually reverses polarity—in other words the first driver 4 reverses from driving the probe support 4a down and towards the sample between t1 and t3, to driving the probe support 4a up and away from the sample in a retract phase between time t3 and t5.

Unlike the second drive signal which is modified rapidly at time t2 as indicated at 51 so that the cantilever unbends quickly, this reversal of the first drive signal is more gradual so there is a control phase between time t2 and time t3 in which the probe support 4a continues to move towards the sample surface. In the response step at time t2 the cantilever 2 of the selected probe is rapidly unbending so although the probe support 4a is still moving slowly towards the sample, the motion of the probe tip 3 due to the unbending is dominant so that the overall motion of the probe tip 3 is a rapid deceleration followed by a rapid retraction as indicated at 53 in FIG. 3. However once the cantilever 2 has become fully unbent, then the motion of the probe tip 3 is controlled by the first driver 4 so that in the control phase between time t2 and t3 the Z-motion of the probe tip 3 reverses so that it starts moving down again towards the surface of the sample as indicated at 54 in FIG. 3.

At time t3, at the end of the control phase, the probe support 4a has reached its low point for this cycle and is stationary in Z. The first driver 4 then retracts the probe support 4a up and away from the sample surface in a retract phase from time t3 to time t5.

At time t2 the tip 3 of the selected probe has interacted with the surface of the sample, but the tips 3a-d of the other (unselected) probes have not interacted with the surface of the sample. In the control phase between time t2 and t3 the vertical motion of the probe support 4a is decelerated and then reversed so that the tips 3a-d of the other probes are prevented from interacting with the surface of the sample during that interaction cycle. The duration of the control phase is chosen so that the retract phase starts at time t3 sufficiently soon after the response step at time t2 to prevent the tips of the rest of the probes from interacting with the surface of the sample.

Between time t3 and t4 the cantilever 2 is straight. At time t4 the waveform generator 40 resets the second drive signal as indicated at 57, to perform the probe selection step of the next interaction cycle. Resetting of the second drive signal causes the actuation beam 32 to turn on again. This causes the selected cantilever 2 to become bent again as indicated in dashed lines in FIG. 4 at 63 and the probe tip 3 to move rapidly towards the sample as indicated at 55 in FIG. 3 and back out of the common plane 6. This resetting of the second drive signal is performed during the retract phase at time t4 at the beginning of the next cycle of the first drive signal, or it may be performed at time t5 at the end of the retract phase.

In the next cycle the probe has traversed the step 50 in the surface of the sample, so when the surface signal for that cycle is generated at time t6, the probe support 4a has moved down further than in the previous cycle. At time t7 the second drive signal is reset again to reselect the probe 2, 3 for the next cycle.

An advantage of the drive method shown in FIGS. 3 and 4 is that for each cycle the second drive signal remains substantially constant as indicated at 58 as the probe moves towards the surface of the sample (between time t1 and time t2) until the second drive signal is modified at time t2 in response to receipt of the surface signal. This ensures that when the surface signal is detected, the cantilever 2 is at a known angle relative to the sensing beam 103 of the interferometer detector 10. In other words, at the time of the detection step (t2 or t6) the actuation beam 32 is on and the selected cantilever 2 is bent down by a predetermined amount. Thus the angle of the cantilever 2 relative to the sensing beam 103 of the interferometer detector 10 is the same for each cycle at the time of the detection step (plus or minus a small deviation caused by the dither signal). This is advantageous because it means that no correction of the output of the interferometer detector 10 is required.

In summary, the scanning probe system is operated to perform multiple interaction cycles. Two full interaction cycles are shown in FIG. 3. Each interaction cycle comprises: in a probe selection step at time t0/t4, bending the cantilever of a selected one of the probes to move its tip closer to the surface of the sample than the tips of the rest of the probes; in an approach phase from t1 to t2 (or t5 to t6), moving the probe support 4a down so that the tips of the probes move together towards the surface of the sample; in a detection step at time t2/t6, generating a surface signal on detection of an interaction of the tip of the selected probe with the surface of the sample, before the tips of the rest of the probes have interacted with the sample; in a response step immediately after the detection step at time t2/t6, unbending the selected probe in response to the generation of the surface signal, whilst keeping the shape of the cantilevers of the rest of the probes bent; in a control phase between t2 and t3, after the response step and before the retract phase, controlling the movement of the probe support 4a so that the tips of the rest of the probes are prevented from interacting with the surface of the sample; and in a retract phase starting at time t3 (the end of the control phase) moving the probe support so that the tips of the probes retract together away from the surface of the sample.

Figure 5:
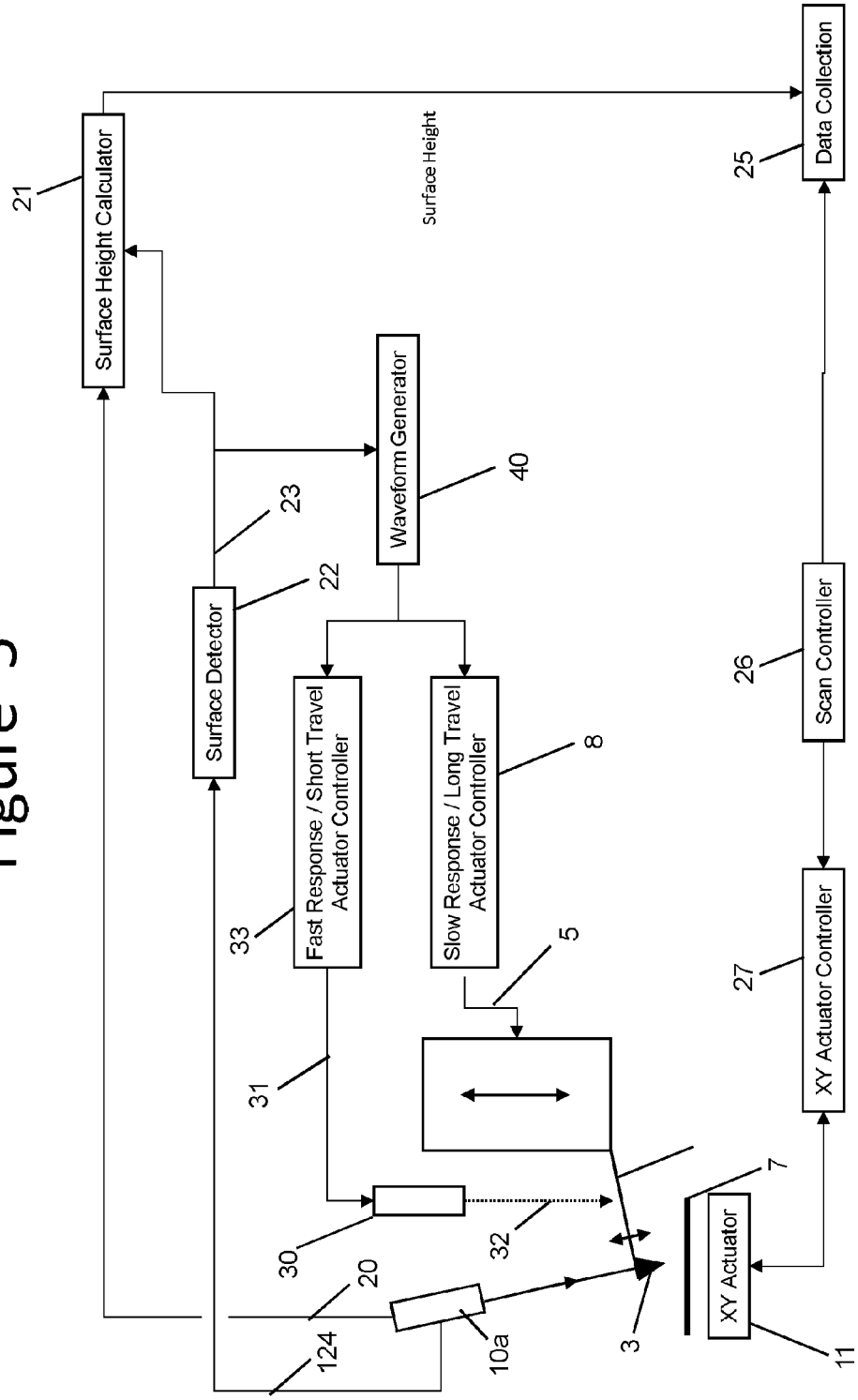
FIG. 5 shows a scanning probe microscopy system according to a further embodiment.
Figure 6:
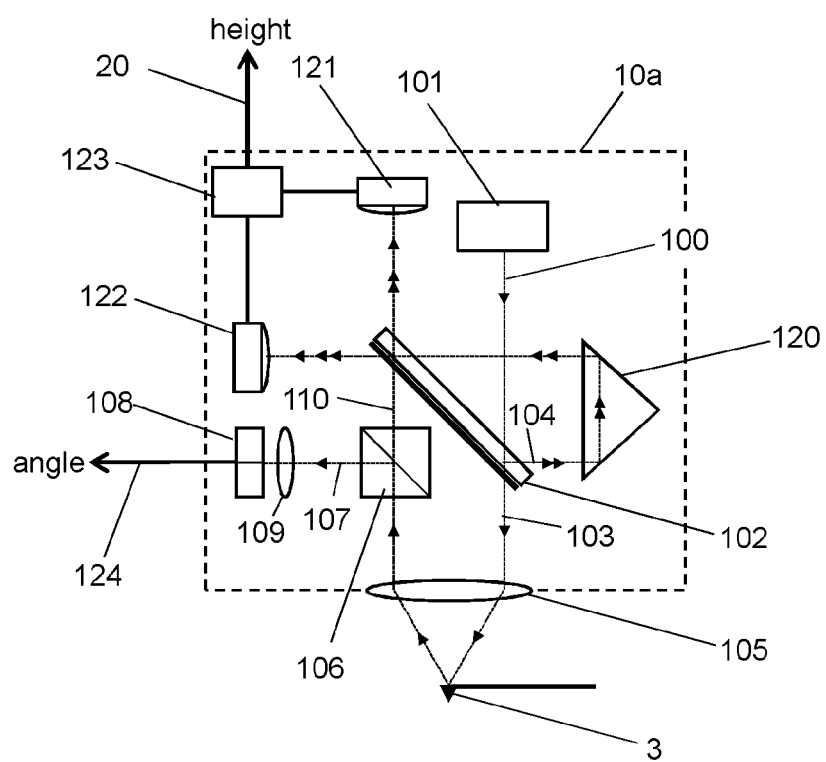
FIG. 6 is a detailed view of the detector in the system of FIG. 5.

FIGS. 5 and 6 shows a further embodiment in which an optical-lever based angle signal 124 is used to detect the surface position rather than the interferometer based height signal 20. In this case, the reflected beam from the cantilever is split by a beam splitter 106 into first and second components 107, 110. The first component 107 is directed to a segmented photodiode 108 via a lens 109, and the second component 110 is split by the beam splitter 102 and directed to the photodiodes 121, 122 for generation of the height signal on the output line 20.

The embodiment of FIGS. 5 and 6 can optionally use a DC threshold detection method to generate the surface signal rather than the resonant detection method described above in relation to FIG. 1. No dither signal is applied by the waveform generator 40, and the segmented photodiode 108 is used instead to provide an angle signal 124 which is input to the surface detection unit 22. The segmented photodiode 108 is split into a number of segments (typically four). If the angle of the cantilever 2 changes, then the position of the reflected beam on the photodiode 108 also changes. So the relative outputs of the segments of the segmented photodiode 108 gives an indication of the angle of the cantilever relative to the sensing beam 103. This is output as an angle signal on output line 124.

As mentioned above, during the approach phase between time t1 and time t2 the angle of the cantilever 2 of the selected probe is substantially constant. At time t2 the probe tip 3 interacts with the surface of the sample 7 which causes the cantilever 2 to bend up. When the angle of the cantilever 2 (as measured by the angle signal on output line 124) changes by more than a preset DC threshold, then the surface detection unit 22 generates the surface signal.

Figure 7:
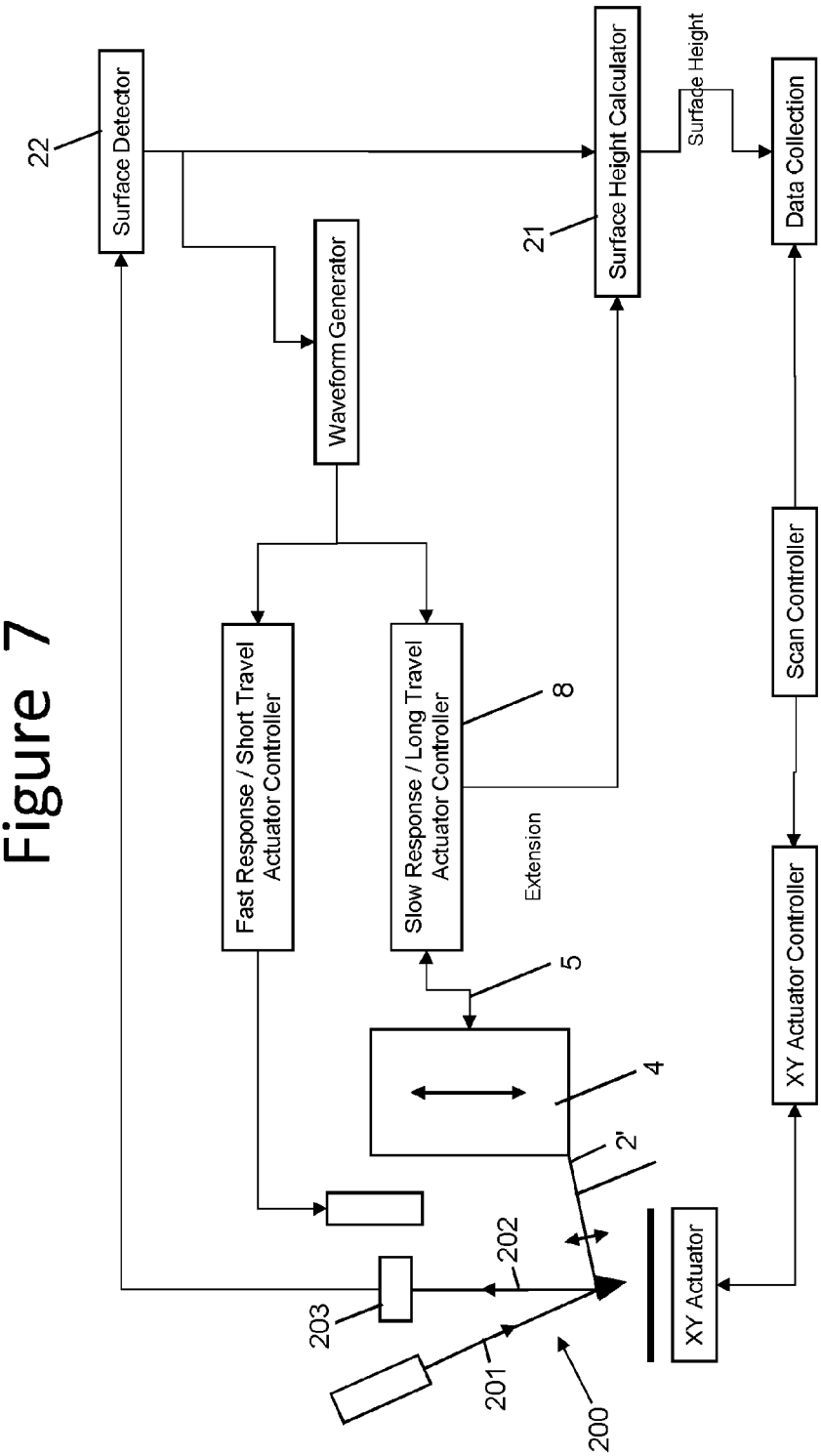
FIG. 7 shows a scanning probe microscopy system according to a further embodiment.

FIG. 7 shows a scanning probe microscopy system according to a further embodiment. Many of the elements of FIG. 7 have equivalents in FIGS. 1, 2, 5 and 6 and the same reference number is used to indicate equivalent components.

The detector 10a of FIG. 6 incorporates a pair of photodiodes 121, 122 for detecting the height of the probe by interferometry, and a segmented photodiode 108 for detecting the angle of the probe by means of an optical lever. In the embodiment of FIG. 7 the detector 10a is replaced by a detector 200 which only detects an angle of the probe by means of an optical lever. Thus the detector 200 consists of a laser which directs a sensing beam 201 onto the cantilever, and a reflected beam 202 falls onto a segmented photodiode 203 which operates in a similar fashion to the segmented photodiode 108 described above.

The angle signal output from the detector 200 is fed to the surface detection unit 22 which generates a surface position signal using either the previously described resonant detection method or the previously described DC threshold detection method.

In the case of the previous embodiments, the surface height calculator 21 measures the surface height based on the height signal 20 output from the interferometer at the time of generation of the surface signal. In the case of FIG. 7 the surface height calculator 21 instead measures the surface height based on the piezoelectric movement of the first driver 4. That is, the surface height calculator 21 measures the surface height for each cycle based on the value of the first drive signal at the first driver input 5 at the time of generation of the surface signal. Alternatively there may be a sensor, such as a strain gauge, on the first driver 4 which measures its extension. This sensor could be used to control the first driver 4 and also provide a measurement of its position/extension for the determination of the surface height. The signals from the strain gauge sensor may be output on the line 5 (which is therefore shown as a double-headed arrow) and then passed on to the height calculator 21.

Note that the embodiment of FIG. 7 is particularly preferred since it reduces the complexity by removing the need for an interferometer-based detection system. Importantly, the angle of the cantilever does not change during the approach phase so its change of angle caused by the sample at the point of surface detection, as measured by the optical-lever based detector 200, can be used to generate the surface position signal.

Figure 8:
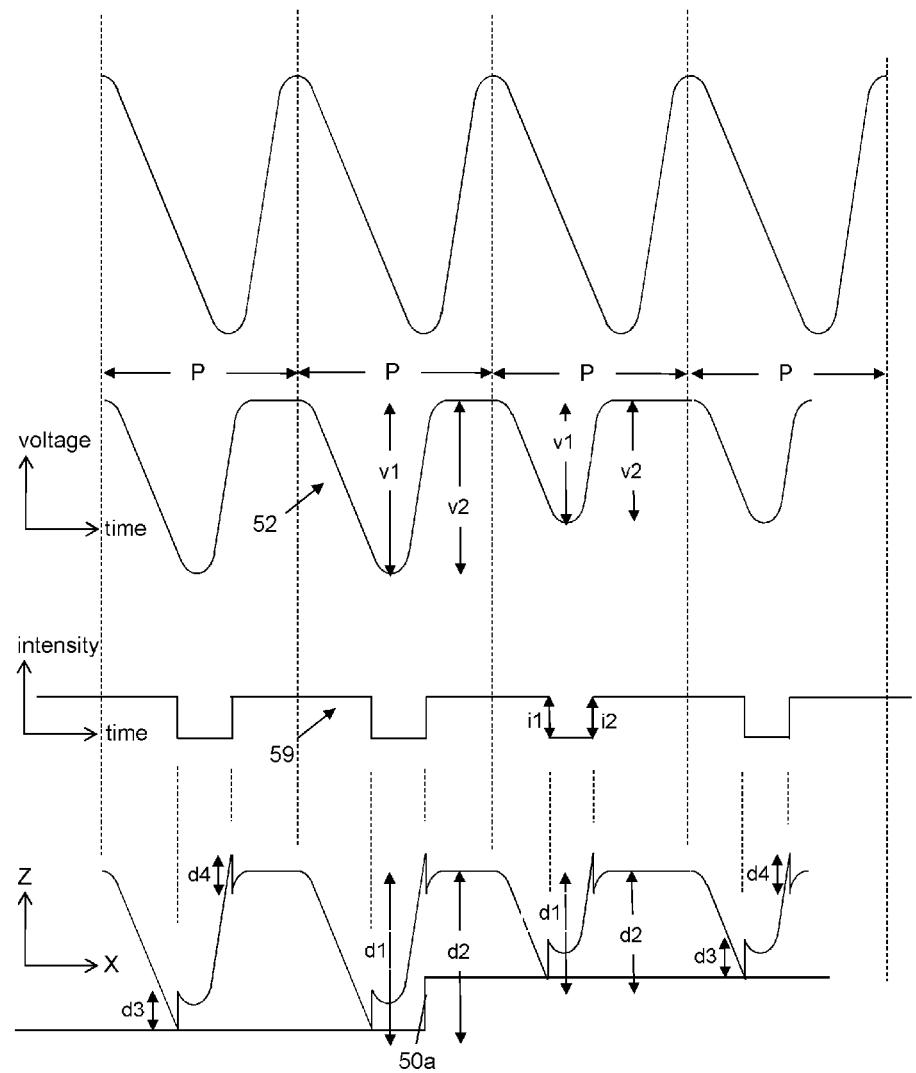
FIGS. 8-10 show the first and second drive signals and the associated trajectory of the selected probe tip according to further embodiments.

FIG. 8 shows an alternative method for the waveform generator 40 to control the first and second drive signals during the scanning of a sample. The first drive signal 52 applies a voltage change (v1+v2) for each cycle which causes the base 2' of the cantilever to move over an associated first travel distance (d1+d2). Similarly the second drive signal 59 applies an intensity change (i1+i2) for each cycle which causes the probe to bend up and down and move its tip over an associated second travel distance (d3+d4). The second travel distance (d3+d4) is less than the first travel distance (d1+d2) for each cycle. After the step 50a the first travel distance (d1+d2) imparted by the first driver reduces but remains greater than the second travel distance (d3+d4) imparted by the second driver.

In FIG. 3 the first drive signal starts the next approach phase immediately at the end of the preceding retract phase so the period P2 of the second cycle is longer than the period P1 of the first cycle. In FIG. 8 there is a hold phase for the first drive signal at the end of each retract phase, and the length of each hold phase is controlled so that the period P of each cycle is the same.

Figure 9:
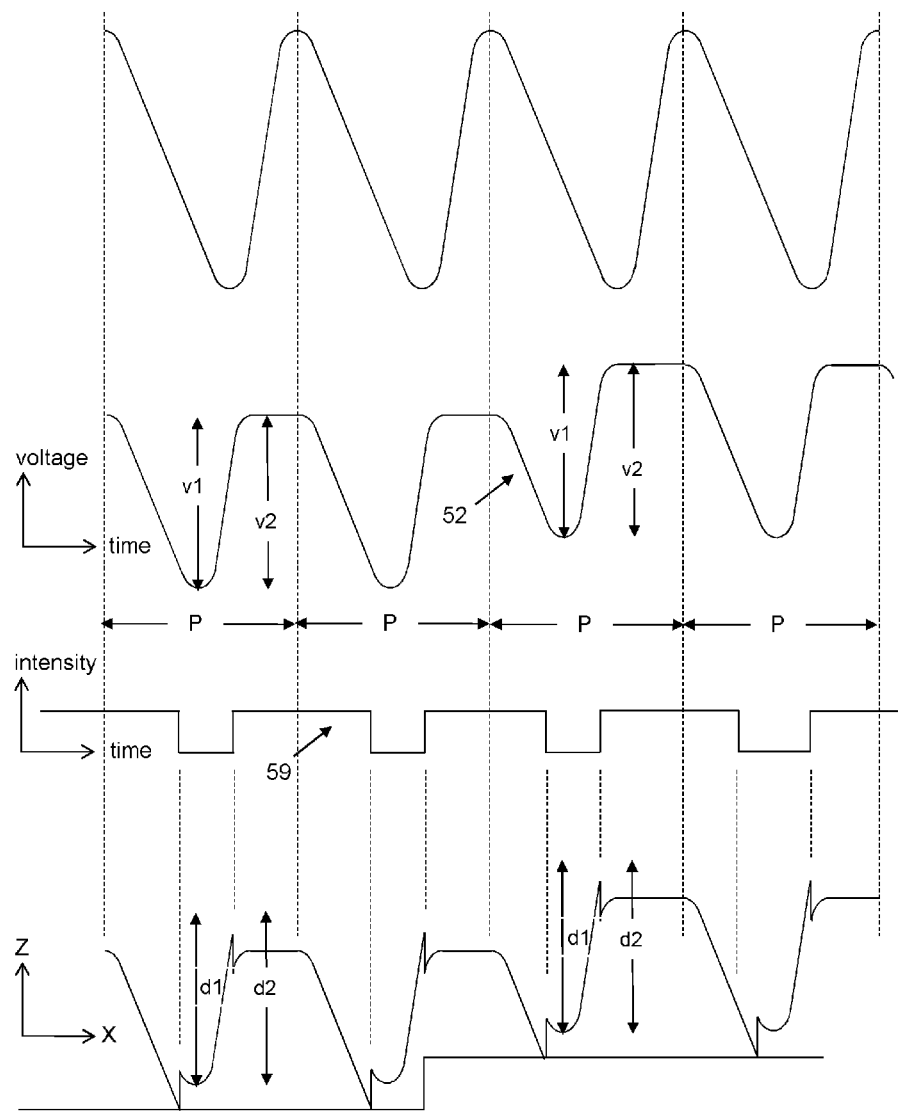

FIG. 9 shows an alternative method for the waveform generator 40 to control the first and second drive signals during the scanning of a sample. The voltage change (v1+v2) and associated first travel distance (d1+d2) reduce for one cycle at the step 50a, and then immediately return to a preset value for the next cycle.

Figure 10:
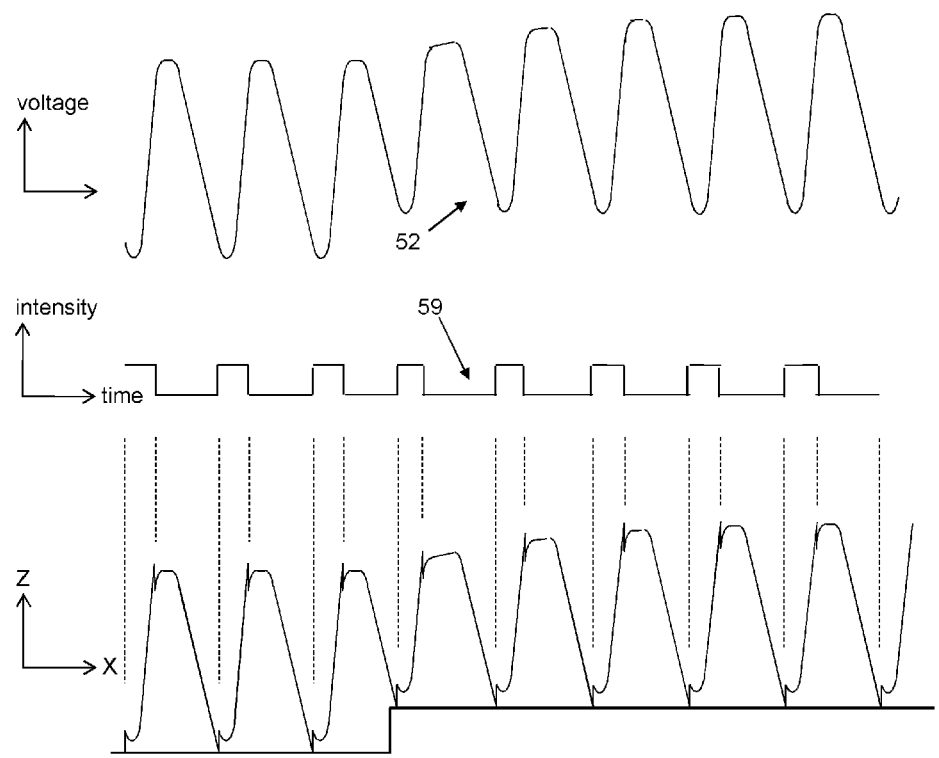

FIG. 10 shows an alternative method for the waveform generator 40 to control the first and second drive signals during the scanning of a sample. The voltage change (v1+v2) and associated first travel distance (d1+d2) reduce at the step 50a and return more gradually to the preset value (in this case over the course of about four cycles).

Figure 11:
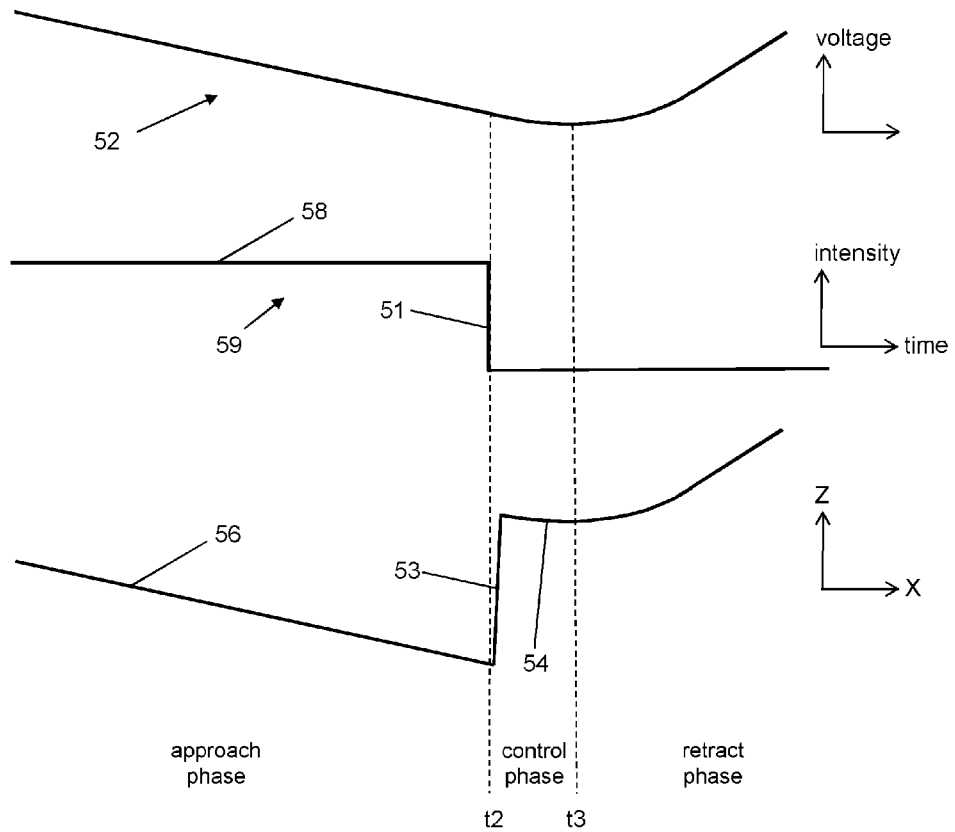
FIGS. 11-13 are enlarged views showing the first and second drive signals and the associated trajectory of the selected probe tip according to further embodiments after generation of the surface signal.
Figure 12:
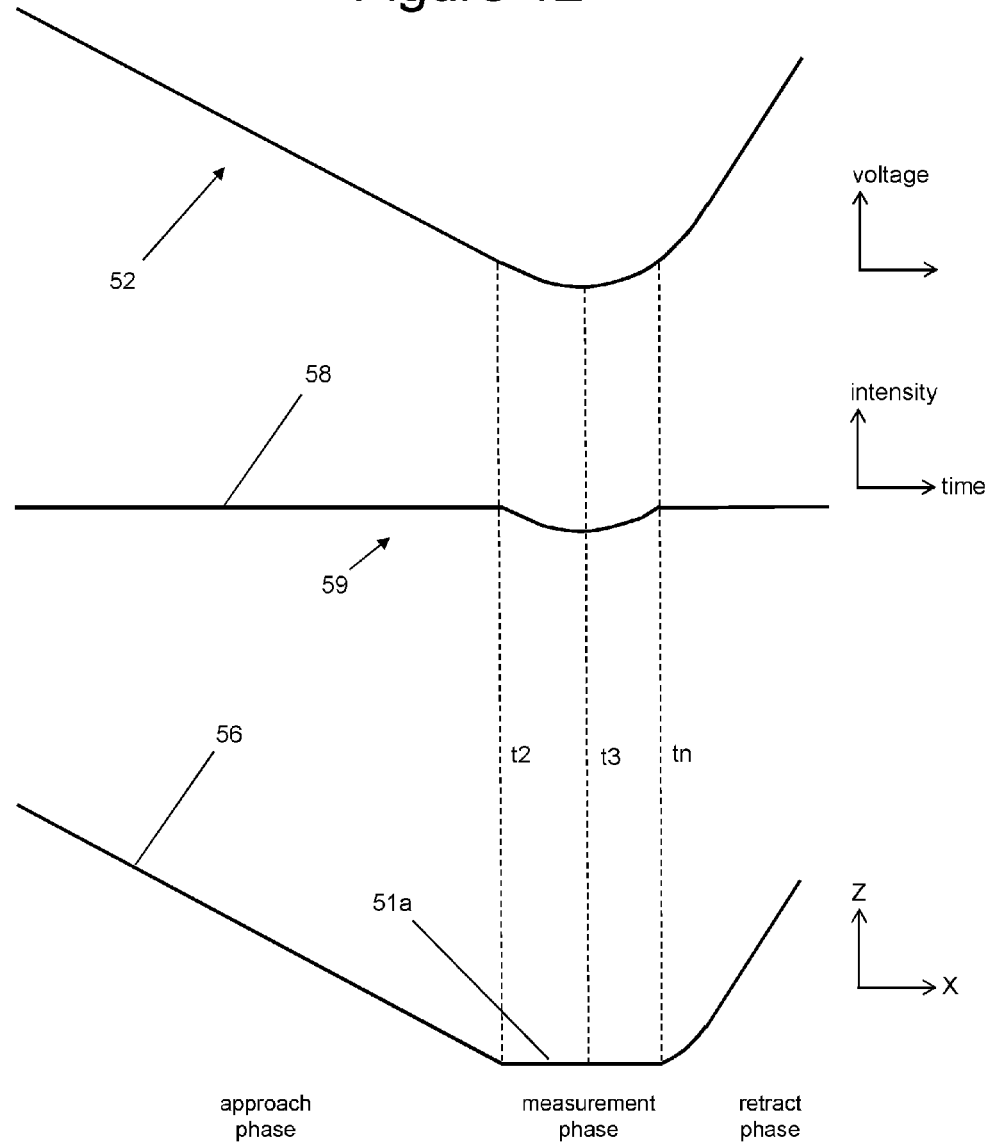
Figure 13:
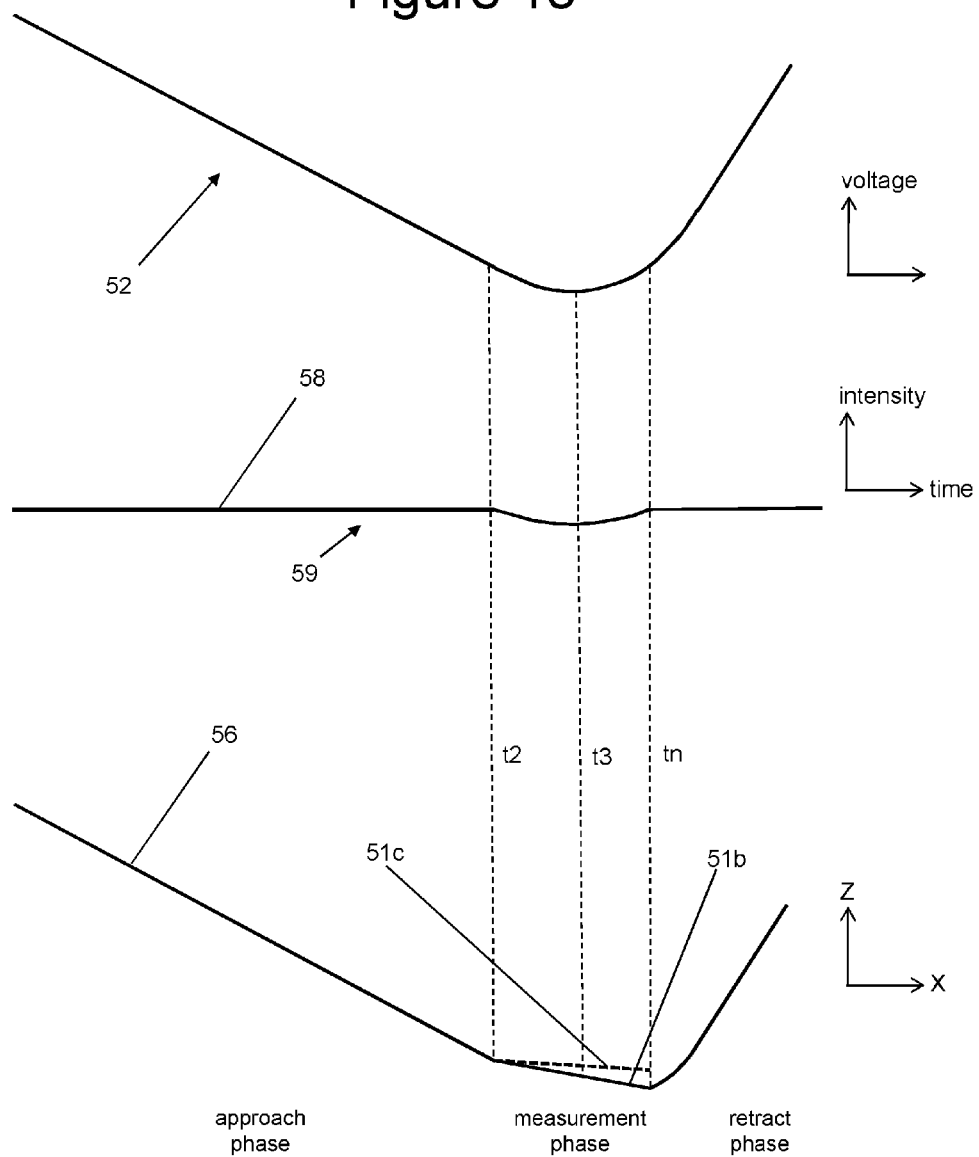

FIG. 11 is an enlarged view showing the first and second drive signals 52, 59 at time t2 and t3. In the response step, immediately after time t2, the actuation beam 32 turns off completely so the probe tip 3 decelerates rapidly until it is stationary in Z and then immediately retracts as indicated at 53 until the cantilever 2 has completely straightened and the probe tip has returned to the common plane 6. This is followed by a control phase in which the vertical (Z) motion of the probe support 4a slows and then stops before the retract phase. Alternatively the second driver 30 may not immediately retract the probe after it has decelerated due to the initial unbending of the cantilever, but instead it may control the combined motion imparted to the probe tip by the first and second drivers in order to measure information about the sample (e.g. its material stiffness) in an extended response step, referred to below as a measurement phase. FIGS. 12 and 13 give examples of how the waveform generator 40 can control the first and second drive signals during such a measurement phase.

In FIG. 12 the second drive signal 59 controls the shape of the cantilever so as to precisely cancel the motion imparted by the first drive signal 52, so the resultant combined motion of the probe tip is a measurement phase in which the height of the probe tip is held constant between time t2 and time tn as indicated by a horizontal line 51a in the probe tip trajectory. Such a constant static position will provide a constant interaction with the surface of the sample, enabling multiple height measurements (or other sample interaction measurements) to be taken during the measurement phase. These multiple measurements can then be averaged to improve the signal-to-noise ratio.

Between time t2 and time t3 the intensity of the actuation beam 32 reduces, causing the cantilever 2 of the selected one of the probes to unbend partially so its tip 3 moves towards the common plane 6 containing the tips 3a-d of the other probes without fully returning to the common plane 6.

Between time t3 and time tn the intensity of the actuation beam 32 increases and returns to its previous value, causing the cantilever 2 of the selected one of the probes to bend back to its previous angle. This bending of the cantilever between time t3 and time tn means that in the case of FIG. 12, unlike in the previous embodiments, it is not necessary to have a probe selection step for each cycle at time t0 in which the actuation beam is turned on to cause the selected one of the probes to bend and its tip to move out of the common plane, as indicated at 55 in FIG. 3 for example. Instead, there is a single probe selection step (which can be carried out before or during the lateral scanning movement between the probe support and the surface of a sample) which bends the selected probe out of the common plane 6, and the tip 3 of the selected probe remains bent and out of the common plane 6 for the entirety of the scanning process, until another probe is selected.

In FIG. 13 the second drive signal 59 drives the probe so that probe tip rapidly decelerates, but then instead of retracting or holding the probe tip, the second drive signal 59 causes the probe tip to continue moving down during the measurement phase, albeit at a lower speed, as indicated by a downwardly sloping straight line 51*b* in the probe tip trajectory. In this example the second drive signal 59, combined with the first drive signal 42, apply a constant downward force to the probe tip which is reacted by the surface of the sample during the measurement phase. This downward force is accurately controlled, and the resulting trajectory of the probe tip during the measurement phase will depend on the stiffness of the sample. So by way of example if the surface of the sample is particularly stiff then the probe tip will follow a shallower trajectory 51*c*. Thus the profile of the trajectory 51*b*, 51*c* in the measurement phase can be analysed to determine the stiffness of the sample. Alternatively the application of a known downward force could be used to modify the sample for nanolithography.

The method of FIG. 13 is similar to the method of FIG. 12 in that between time t2 and time t3 the intensity of the actuation beam 32 reduces rather than turning off completely, causing the cantilever 2 of the selected one of the probes to unbend partially so its tip 3 moves towards the common plane 6 containing the tips 3*a-d* of the other probes without fully returning to the common plane 6. Likewise, in the case of FIG. 13 between time t3 and time tn the intensity of the actuation beam 32 increases and returns to its previous value, causing the cantilever 2 of the selected one of the probes to bend back to its previous angle.

In the methods described above a probe 2, 3 is selected by illuminating it with an actuation beam 32, the actuation beam 32 causing the selected probe 2, 3 to bend and its tip to move out of a common plane containing the tips 3*a-d* of the other probes. This probe selection step may happen only once before a series of interaction cycles in which the same selected probe interacts with the surface of the sample, or it may happen every cycle as in FIG. 3 for example. The tips 3*a-d* of the rest of the probes remain in the common plane 6 and inoperative during this time.

Figure 14:
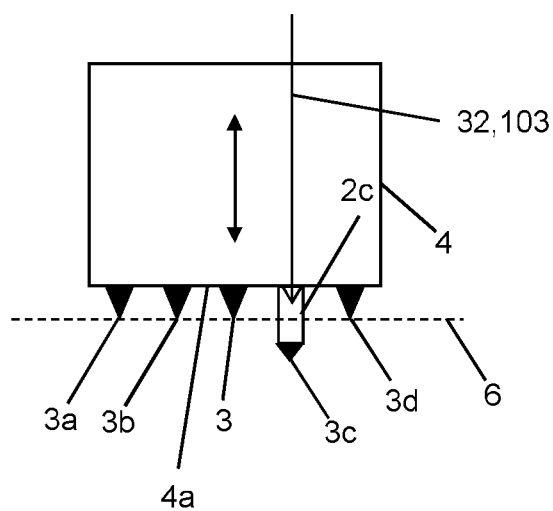
FIG. 14 shows an actuation beam and sensing beam illuminating the cantilever of a newly selected probe.

At a later stage it may be desirable to deselect the probe 2, 3 and select another one of the multiple probes to interact with the sample, as shown in FIG. 14 which shows the tip 3 of the previously selected probe in the common plane 6, and the next probe 2*c*, 3*c* selected. The newly selected probe 2*c*, 3*c* may be selected for a number of reasons: for instance the previously selected probe 2, 3 may have become worn or otherwise defective, or the newly selected probe 2*c*, 3*c* may have different characteristics to the previously selected probe 2, 3 so it can measure a different property of the same sample. The interaction process described above can then be repeated using the newly selected probe 2*c*, 3*c* over a further set of multiple interaction cycles; the tips 3, 3*a*, 3*b*, 3*d* of the other probes remaining in the common plane 6 and inoperative during this time.

FIG. 14 shows the actuation beam 32 and sensing beam 103 illuminating the cantilever 2*c* of the newly selected probe, rather than the previously selected probe 2, 3 as in FIG. 1*c*. Switching between these probes may be achieved by operating a motorised actuator (not shown) to move the probe support 4*a* in the X direction so the newly selected probe moves into the path of the beams 32, 103; or by moving the beams 32, 103 onto the newly selected probe.

Figure 15A:
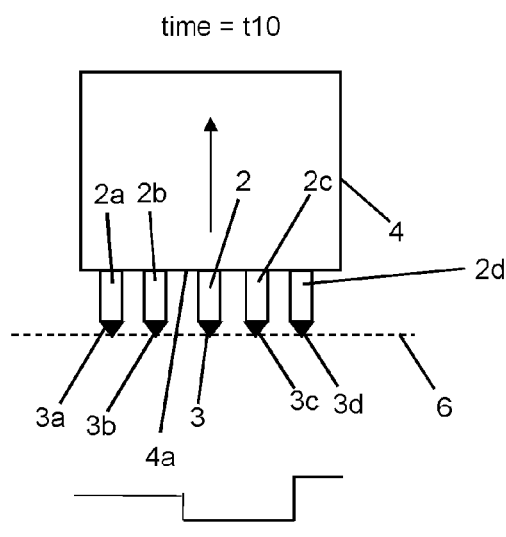
FIGS. 15a-h show various stages in a single interaction cycle for a further embodiment in which all of the probes interact with the sample.
Figure 15B:
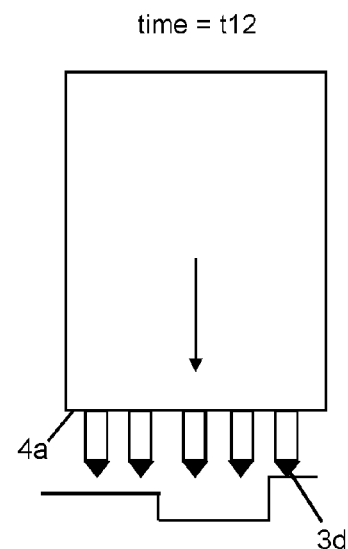
Figure 15C:
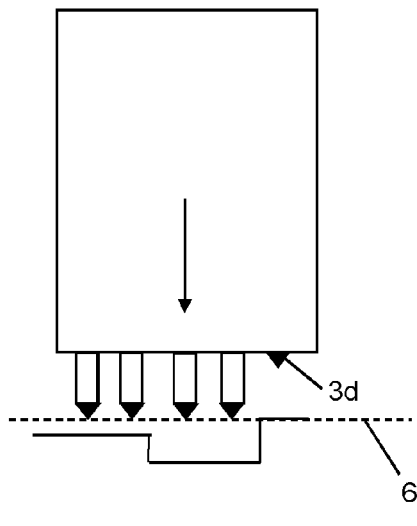
Figure 15D:
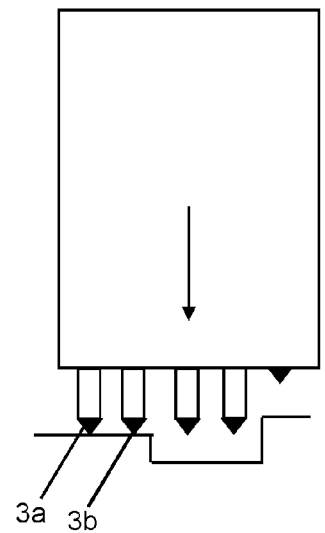
Figure 15E:
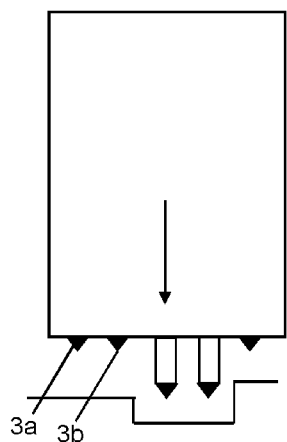
Figure 15F:
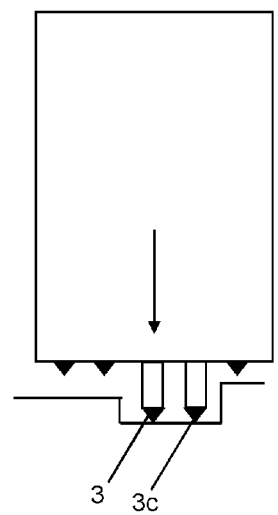
Figure 15G:
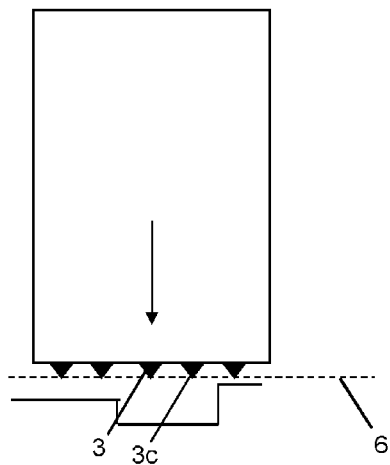
Figure 15H:
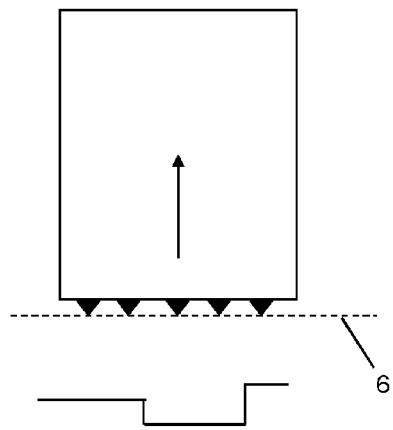
Figure 16:
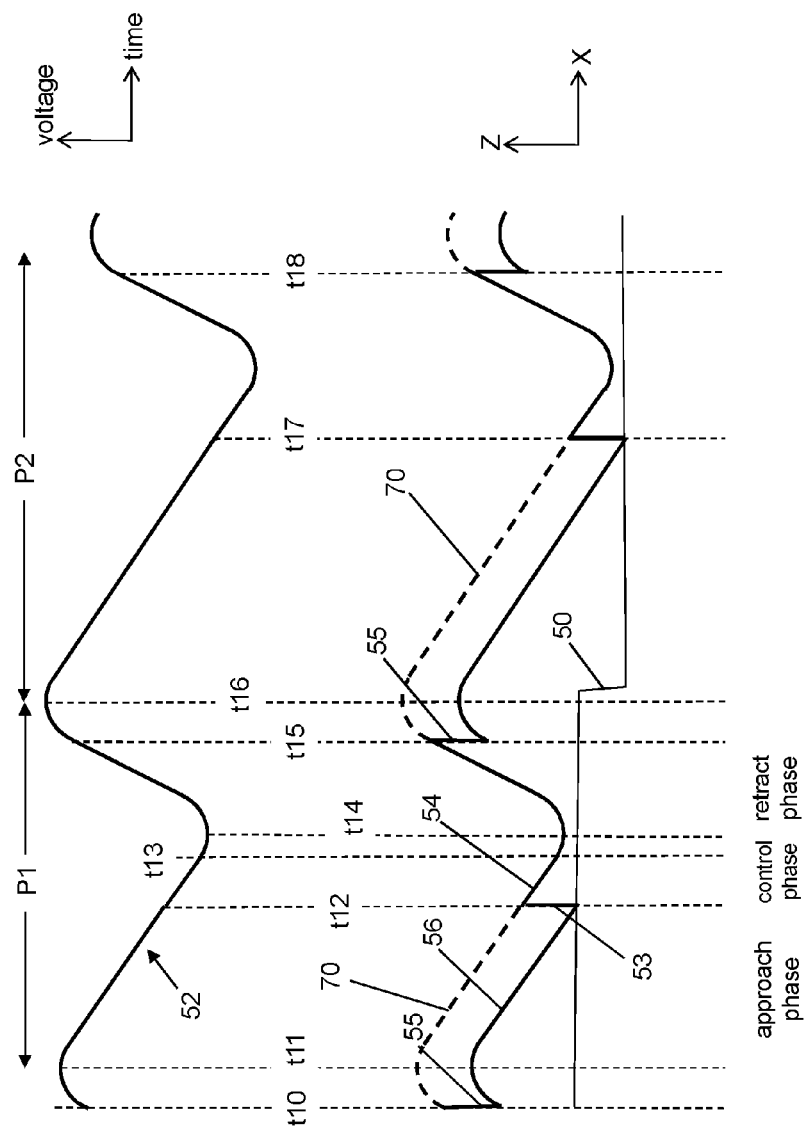
FIG. 16 shows the first drive signal, the trajectory of one of the probes and the trajectory of the probe support for the embodiment of FIGS. 15a-h.
Figure 17:
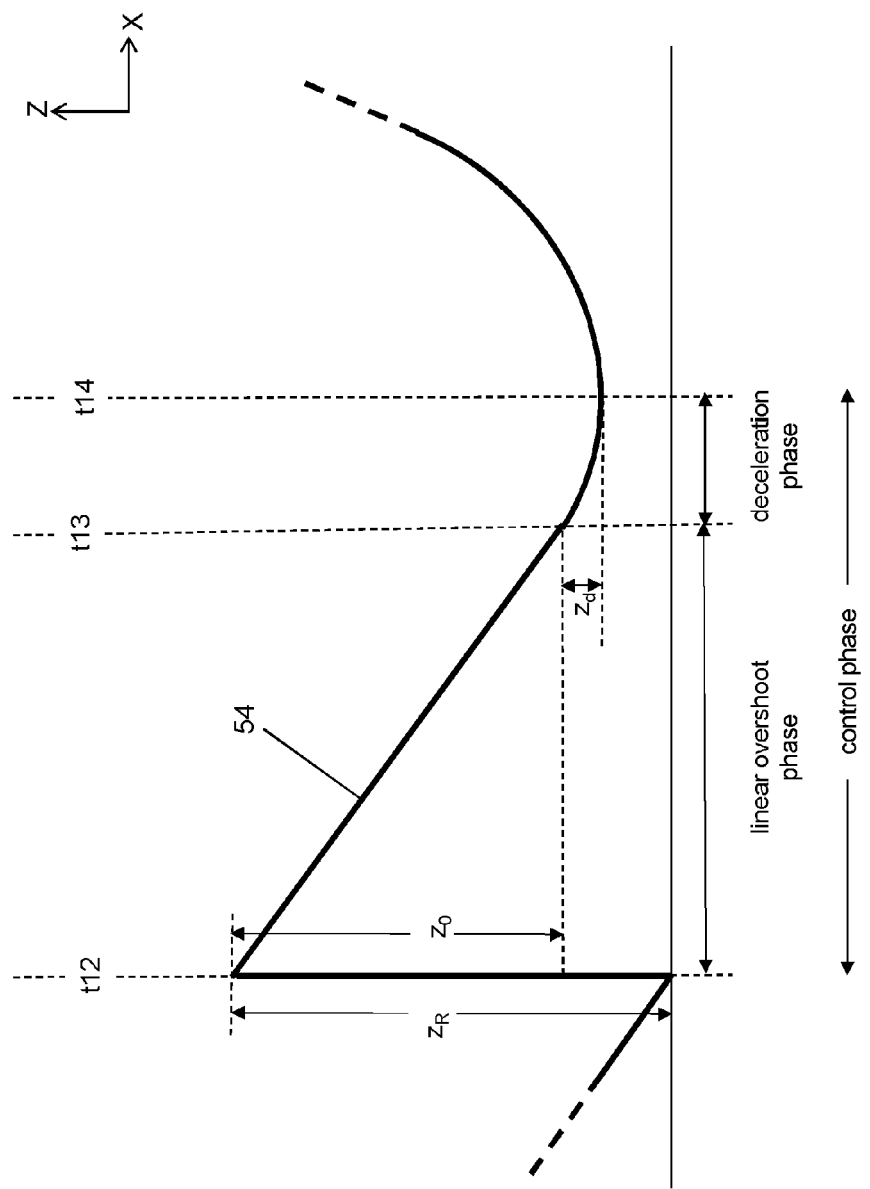
FIG. 17 shows the trajectory of one of the probes during part of one interaction cycle for the embodiment of FIGS. 15a-h.

FIGS. 15-17 illustrate an alternative embodiment in which all of the probes interact with the sample for each interaction cycle, rather than just one probe. The solid line 53-56 in the lower half of FIG. 16 and in FIG. 17 indicates the path of one of the probe tips 3*d*, whilst the dashed lines 70 in FIG. 16 indicate the path of the probe support 4*a*.

As in the embodiment previously described, a lateral (XY) scanning movement between the probe support 4*a* and the surface of the sample is generated by moving the probe support 4*a*, or by moving the sample. FIGS. 15*a-h* show the change in Z-position of the probe support 4*a* and the probes tips 3, 3*a-d* towards and away from the surface of the sample during a single interaction cycle, and ignore the lateral scanning movement which is relatively small for a given interaction cycle compared with the vertical (Z) motion. The range of expansion of the piezoelectric driver 4 is exaggerated for purposes of illustration.

At time t10 all of the cantilevers 2, 2*a-d* are illuminated simultaneously so that they bend down together, with their tips 3, 3*a-d* remaining in the same plane 6 as shown in FIG. 15*a*. This illumination may be achieved using one actuation beam per probe, or by some other arrangement. Examples of suitable arrangements for actuating multiple probes are described in WO/2014/033451 and WO/2014/033452. Similarly, the cantilevers 2, 2*a-d* may be illuminated by one sensing beam per probe, or by some other arrangement. Examples of suitable arrangements for detecting the positions of multiple probes are also described in WO/2014/033451 and WO/2014/033452.

The scanning probe system then undergoes an approach phase between time t11 and time t12, in which the probe support 4*a* is moved down by the driver 4 so that the tips 3, 3*a-d* of all of the probes move down together towards the surface of the sample as indicated at 56 in FIG. 16. A majority of this approach phase is a linear approach phase during which the Z-component of the velocity of the probe support 4*a* is constant, so that the tips of the probes 3, 3*a-d* move down together towards the surface of the sample at a substantially constant rate.

The tips of all of the probes remain in the same plane 6 during the linear approach phase. They may undergo a small dither motion about the plane 6 (typically less than 10 nanometres in amplitude at a frequency of ~1 MHz) driven by a dither signal. In such a case the tips can still be considered to lie in the same plane 6 since the dither motion is very small compared with the motion of the probe support.

In a first detection step at time t12 (FIG. 15*b*) a surface signal is generated on detection of an interaction of the tip 3*d* of a first one of the probes with a high point of the surface of the sample. As can be seen in FIG. 15*b* this occurs before the rest of the probes have interacted with the sample. In a response step immediately after the detection step at time t12, the cantilever 2*d* of the first one of the probes is rapidly unbent in response to the generation of the surface signal by turning its actuation beam off, whilst keeping the shape of the cantilevers of the rest of the probes substantially unchanged (i.e. bent down). FIG. 15c shows the retracted probe tip 3d immediately after the response step, with the rest of the probes remaining bent and in the common plane 6. The Z-distance travelled by the tip 3d as it retracts during the response step is labelled $z_R$ in FIG. 17. The detection step at time t12 is immediately followed by a control phase from time t12 to t14 during which the probe support 4a continues to move down as described below.

The control phase begins with a linear overshoot phase from time t12 to t13. During the linear overshoot phase, the probe support 4a continues to move down at the same speed as during the immediately preceding linear approach phase. So the tips 3, 3a-d of the probes continue to move together towards the surface of the sample at a constant rate as indicated at 54, which is the same rate as during the linear approach phase. The maximum vertical distance $z_0$ travelled by the probe support 4a during the linear overshoot phase is carefully chosen, for reasons explained below.

As the linear overshoot phase progresses, the tips 3a, 3b of two probes simultaneously interact next with the surface as shown in FIG. 15d. In a second detection step a surface signal is generated on detection of the interaction of the tips 3a, 3b with the surface of the sample. The cantilevers of these probes are then rapidly unbent in a second response step so their tips 3a, 3b are retracted from the sample surface as illustrated in FIG. 15e.

Later on in the linear overshoot phase the tips 3, 3c of the last two probes interact with the sample surface as shown in FIG. 15f, and are rapidly retracted as shown in FIG. 15g in a third and final response step at time t13. After the last two probes have been retracted at time t13, the cantilevers are all straight with their tips in the common plane 6 as shown in FIGS. 15g and 15h.

The third and final response step at time t13 is immediately followed by a deceleration phase between t13 and t14, during which the driver 4 is controlled so that the vertical motion of the probe support 4a, and the associated Z-velocity of the probe tips 3, 3a-d towards the surface of the sample, slows down and then stops at time t14. The vertical distance travelled during the deceleration phase is given by $z_d$ (FIG. 17).

Next, in a retract phase between t14 and t15 the probe support 4a is driven back up so that the tips of the probes retract together away from the surface of the sample, as shown in FIG. 15h. The distances $z_R$, $z_0$ and $z_d$ are chosen such that the following equation is satisfied:

$$z_R > z_0 + z_d > z_f$$

where: $z_R$ is the vertical (Z) distance travelled by the probe tip as it retracts during the response step; $z_0$ is the vertical (Z) distance travelled by the probe support and the probe tips during the linear overshoot phase; $z_D$ is the vertical (Z) distance travelled by the probe support and the probe tips during the deceleration phase; and $z_f$ is the known maximum feature height (Z) of the sample.

Making $z_R$ greater than $z_0 + z_d$ ensures that the first probe to interact with the surface does not interact again with the surface during the control phase. Making $z_0 + z_d$ greater than $z_f$ ensures that for a given interaction cycle all probes will interact with the sample surface. In other words, the control phase will not end before all probes have reached the sample surface. The distance $z_0$ travelled by the probe support and the probe tips during the linear overshoot phase is determined by the duration (t13-t12) of the linear overshoot phase and the constant known Z-velocity of the probe support 4a.

In this example the deceleration phase is triggered by the generation of the surface signal for the last two probes at time t13 so the distance $z_0$ varies from cycle to cycle and is not predetermined. In an alternative embodiment the linear overshoot phase may continue beyond time t13 so that the distance $z_0$ is predetermined and the same for each cycle. In this case the predetermined duration of the linear overshoot phase (as determined by the predetermined distance $z_0$) is chosen on the basis of the equation above so that the start of the retract phase is sufficiently delayed after the response step so that the tips of all of the probes interact with the surface of the sample.

In this example a single one of the probes 2d, 3d is first to interact with the sample surface, followed by two pairs of probes (one pair after the other). However it will be appreciated that the interaction sequence will depend on the profile of the sample surface and more typically the probes will interact one by one. So in general terms, the tip(s) of a first subset of the probes is/are the first to interact with the surface of the sample before the rest of the probes have interacted with the sample. This first subset of the probes will usually be only a single probe, but it could be multiple probes. Next a second subset of the probes interacts with the surface of the sample. This second subset of the probes will usually be only a single probe, but it could be multiple probes as in the example of FIG. 15. This process repeats with further subsets until all of the probes have interacted with the surface of the sample.

In summary, the scanning probe system is operated to perform multiple interaction cycles. Two full interaction cycles are shown in FIG. 16. Each interaction cycle comprises: in an approach phase from time t11 to time t12, moving the probe support 4a so that the tips of the probes move together at a substantially constant rate towards the surface of the sample; in a detection step at time t12, generating a surface signal on detection of an interaction of the tip(s) of a first subset of the probes with the surface of the sample before the rest of the probes have interacted with the sample; in a response step immediately after the detection step at time t12, changing a shape of the cantilever(s) of the first subset of the probes in response to the generation of the surface signal, whilst keeping the shape of the cantilever(s) of the rest of the probes substantially unchanged; in a control phase between time t12 and t14, controlling the movement of the probe support so that the tip(s) of the rest of the probes also interact with the surface of the sample; and in a retract phase after time t14, moving the probe support so that the tips of the probes retract together away from the surface of the sample.

Although described above with reference to one or more preferred embodiments, it will be appreciated that various changes or modifications may be made without departing from the scope as recited in the appended claims.

The invention claimed is:

1. A method of operating a scanning probe system, the scanning probe system comprising a probe support and multiple probes carried by the probe support, each probe comprising a cantilever extending from the probe support to a free end and a tip carried by the free end of the cantilever, the method comprising operating the scanning probe system to perform multiple interaction cycles, each interaction cycle comprising:
  a. in an approach phase, moving the probe support so that the tips of the probes move together towards the surface of the sample;
  b. in a detection step, generating a surface signal on detection of an interaction of the tip(s) of a first subset of the probes with the surface of the sample before the rest of the probes have interacted with the sample;

c. in a response step after the detection step, changing a shape of the cantilever(s) of the first subset of the probes in response to the generation of the surface signal; and d. in a retract phase after the response step, moving the probe support so that the tips of the probes retract together away from the surface of the sample.

2. The method of claim 1, wherein the retract phase starts sufficiently soon after the response step to prevent the tip(s) of the rest of the probes from interacting with the surface of the sample at any time during the multiple interaction cycles.

3. The method of claim 1, wherein the response step comprises changing the shape of the cantilever(s) of the first subset of the probes in a first sense, and the method further comprises in a probe selection step changing the shape of the cantilever(s) of the first subset of the probes in a second sense opposite to the first sense to select the first subset of the probes and move the tip(s) of the first subset of the probes closer to the surface of the sample than the tip(s) of the rest of the probes.

4. The method of claim 3, wherein the response step comprises unbending the cantilever(s) of the first subset of the probes, and the method comprises in the probe selection step bending the cantilever(s) of the first subset of the probes to select the first subset of the probes and move the tip(s) of the first subset of the probes closer to the surface of the sample than the tip(s) of the rest of the probes.

5. The method of claim 1, wherein each interaction cycle further comprises in a control phase after the response step and before the retract phase, controlling the movement of the probe support so that the tip(s) of the rest of the probes are prevented from interacting with the surface of the sample.

6. The method of claim 1, wherein the rest of the probes comprise three or more probes.

7. The method of claim 6, wherein the tips of the three or more probes lie in a common plane which moves towards the surface of the sample during the approach phase, and the response step comprises changing the shape of the cantilever(s) of the first subset of the probes in response to the generation of the surface signal to move the tip(s) of the first subset of the probes towards the common plane or into the common plane.

8. The method of claim 1, wherein the retract phase is sufficiently delayed after the response step to ensure that the tip(s) of the rest of the probes also interact with the surface of the sample between the response step and the retract phase for each of the multiple interaction cycles.

9. The method of claim 1, wherein the multiple probes comprise three or more probes, the tips of the three or more probes lie in a common plane which moves towards the surface of the sample during the approach phase, and the response step comprises changing the shape of the cantilever(s) of the first subset of the probes in response to the generation of the surface signal to move the tip(s) of the first subset of the probes out of the common plane.

10. The method of claim 1, wherein each interaction cycle further comprises in a control phase after the response step and before the retract phase, controlling the movement of the probe support so that the probe support follows a predetermined trajectory in which the probe support moves by a predetermined distance.

11. The method of claim 1, wherein each interaction cycle further comprises in a control phase after the response step and before the retract phase, controlling the movement of the probe support so that the tip(s) of the rest of the probes also interact with the surface of the sample during the control phase.

12. The method of claim 1, wherein the approach phase comprises moving the probe support so that the tips of the probes move together towards the surface of the sample at a substantially constant rate.

13. The method of claim 12, wherein each interaction cycle further comprises: in a linear overshoot phase after the response step, controlling the movement of the probe support so that the tip(s) of the rest of the probes continue moving towards the surface of the sample at the substantially constant rate; and in a deceleration phase after the linear overshoot phase and before the retract phase, controlling the movement of the probe support so that the motion of the tip(s) of the rest of the probes towards the surface of the sample slows down and then stops.

14. The method of claim 1, wherein the response step comprises changing an illumination of the cantilever(s) of the first subset of the probes, thereby changing the shape of the cantilever(s) of the first subset of the probes.

15. The method of claim 1, wherein the response step comprises changing the shape of the cantilever(s) of the first subset of the probes in response to the generation of the surface signal to cause the tip(s) of the first subset of the probes to retract away from the surface of the sample.

16. The method of claim 1 further comprising repeating the method with a second subset of the probes.

17. The method of claim 1 further comprising generating a lateral scanning movement between the probe support and the surface of the sample.

18. A scanning probe system comprising a probe support; multiple probes carried by the probe support, each probe comprising a cantilever extending from the probe support to a free end and a tip carried by the free end of the cantilever; a first driver for moving the probe support; a second driver for changing a shape of the cantilever of at least one of the probes; and a surface detector for detecting an interaction of the tip of at least one of the probes with a surface of a sample; wherein the scanning probe system is configured to perform multiple interaction cycles, each interaction cycle comprising:

a. in an approach phase, operating the first driver to move the probe support so that the tips of the probes move together towards the surface of the sample;

b. in a detection step, operating the surface detector to generate a surface signal on detection of an interaction of the tip(s) of a first subset of the probes with the surface of the sample before the rest of the probes have interacted with the sample;

c. in a response step after the detection step, operating the second driver to change the shape of the cantilever(s) of the first subset of the probes in response to the generation of the surface signal; and d. in a retract phase after the response step, operating the first driver to move the probe support so that the tips of the probes retract together away from the surface of the sample.

19. The scanning probe system of claim 18, wherein the multiple probes comprise three or more probes.

20. The scanning probe system of claim 18, wherein the second driver comprises an illuminator for illuminating the cantilever(s) of at least one of the probes.

* * * * *